(12) United States Patent
Russell et al.

(10) Patent No.: US 7,346,249 B2
(45) Date of Patent: Mar. 18, 2008

(54) PHOTONIC BANDGAP OPTICAL WAVEGUIDE WITH ANTI-RESONANT CORE BOUNDARY

(75) Inventors: Philip St. John Russell, Bath (GB); Peter John Roberts, Bath (GB); David Philip Williams, Bath (GB)

(73) Assignee: Crystal Fibre A/S, Birkerod (DK)

( * ) Notice: Subject to any disclaimer, the term of this patent is extended or adjusted under 35 U.S.C. 154(b) by 101 days.

(21) Appl. No.: 10/550,095

(22) PCT Filed: Mar. 22, 2004

(86) PCT No.: PCT/GB2004/001251

§ 371 (c)(1),
(2), (4) Date: Sep. 21, 2005

(87) PCT Pub. No.: WO2004/083918

PCT Pub. Date: Sep. 30, 2004

(65) Prior Publication Data

US 2007/0009216 A1     Jan. 11, 2007

(30) Foreign Application Priority Data

Mar. 21, 2003  (GB) ................................. 0306593.5
Mar. 21, 2003  (GB) ................................. 0306606.5
Sep. 19, 2003  (GB) ................................. 0321991.2
Sep. 19, 2003  (GB) ................................. 0322024.1

(51) Int. Cl.
*G02B 6/02* (2006.01)

(52) U.S. Cl. ...................................... 385/123; 385/125
(58) Field of Classification Search ......... 385/123–128
See application file for complete search history.

(56) References Cited

U.S. PATENT DOCUMENTS 6,444,133 B1    9/2002   Fajardo 6,778,749 B2 *  8/2004   Allan et al. ................. 385/125
2002/0136516 A1  9/2002   Allan

FOREIGN PATENT DOCUMENTS

WO           99/64903 A1    12/1999

(Continued)

OTHER PUBLICATIONS

Litchinitser N.M. et al., "Antiresonant reflecting photonic crystal optical waveguides," *Optics Letters*, Sep. 15, 2002, pp. 1592-1594, p. 1594, vol. 27, No. 18, Optical Society of America.

(Continued)

*Primary Examiner*—Kevin S. Wood
(74) *Attorney, Agent, or Firm*—Buchanan Ingersoll & Rooney PC

(57) ABSTRACT

Improved photonic band-gap optical fibre The present invention relates in particular to improved photonic band-gap optical fibres that can confine light to a core region of the fibre by the action of both a photonic band-gap cladding and an antiresonant core boundary, at the interface between the core and cladding. According to embodiments of the present invention, a fibre has a core, comprising an elongate region of relatively low refractive index, a photonic bandgap structure arranged to provide a photonic bandgap over a range of wavelengths of light including an operating wavelength of light, the structure, in a transverse cross section of the waveguide, surrounding the core and comprising elongate relatively low refractive index regions interspersed with elongate relatively high refractive index regions and a relatively high refractive index boundary at the interface between the core defect and the photonic bandgap structure, the boundary having a thickness around the core such that the boundary is substantially anti-resonant at the operating wavelength of the fibre. In preferred embodiments, the core boundary is a relatively constant thickness region of glass around a hollow core.

18 Claims, 15 Drawing Sheets

FOREIGN PATENT DOCUMENTS

| WO | 99/64904 A1 | 12/1999 |
|---|---|---|
| WO | 00/22466 A1 | 4/2000 |
| WO | 00/60388 A1 | 10/2000 |
| WO | 02/41050 A2 | 5/2002 |
| WO | 02/075392 A2 | 9/2002 |
| WO | 02/084347 A1 | 10/2002 |
| WO | 02/088801 A2 | 11/2002 |

OTHER PUBLICATIONS

White, T.P. et al., "Resonance and scattering in microstructured optical fibers," *Optics Letters*, Nov. 15, 2002, pp. 1977-1979, vol. 27, No. 22, Optical Society of America.

Birks, T.A. et al., "Full 2-D photonic bandgaps in silica/air structures," *Electronics Letters*, Oct. 26, 1995, pp. 1941-1943, vol. 31, No. 22.

Broeng, Jes et al., "Analysis of air-guiding photonic bandgap fibers," *Optics Letters*, Jan. 15, 2000, pp. 96-98, vol. 25, No. 2.

Allan, Douglas C. et al., "Photonic Crystal Fibers: Effective-Index and Band-Gap Guidance," *Proceedings of the NATO Advanced Study Institute on Photonic Crystals and Light Localization*, Photonic Crystal and Light Localization in the 21st Century, 2001, C.M. Soukoulis (ed.), Kluwer Academic Publishers.

Joannopoulos, John D. et al., "Photonic Crystals: Molding the Flow of Light," pp. 127-129, ISBN 0-691-03744, Princeton University Press.

Venkataraman, N. et al., "Low Loss (13dB) Air Core Photonic Bandgap Fibre," Post-deadline paper, ECOC 2002.

Mangan, B.J. et al., "Low loss (1.7 dB/km) hollow core photonic bandgap fiber," Post-deadline paper, OFC 2004.

Smith, Charlene M. et al., "Low-loss hollow-core silica/air photonic bandgap fibre," *Nature*, pp. 657-659, Aug. 7, 2003, vol. 424.

Müller, Dirk et al., "Measurement of Photonic Band-gap Fiber Transmission from 1.0 to 3.0 μm and Impact of Surface Mode Coupling," *Proc. CLEO*, 2003.

International Search Report for PCT/GB2004/001251, dated Jul. 8, 2004.

\* cited by examiner

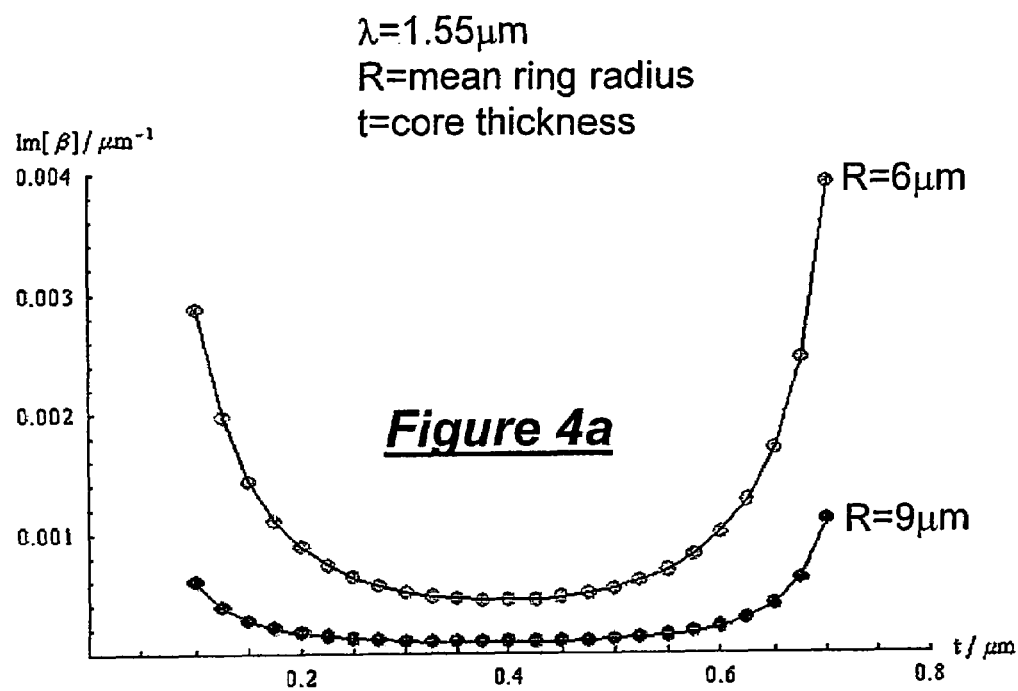
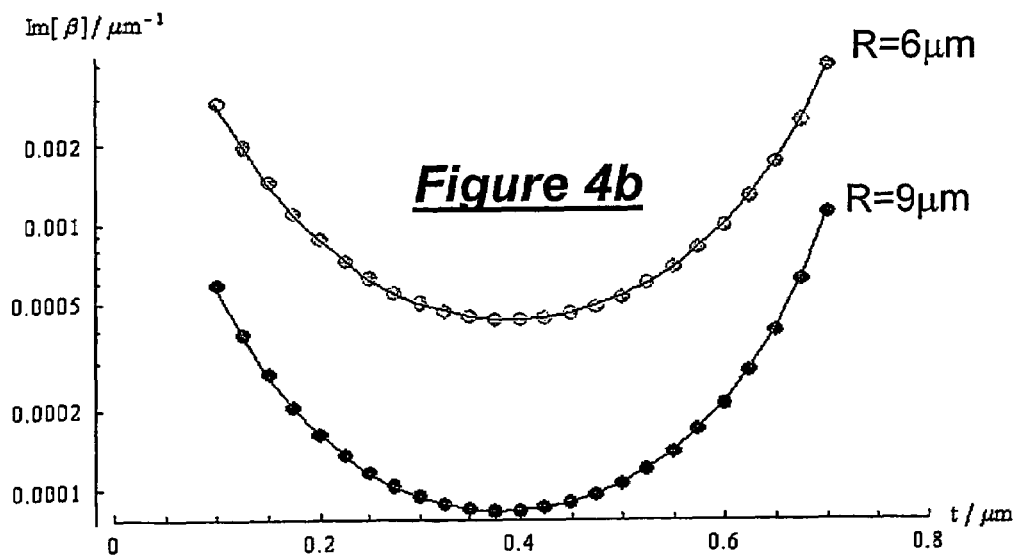

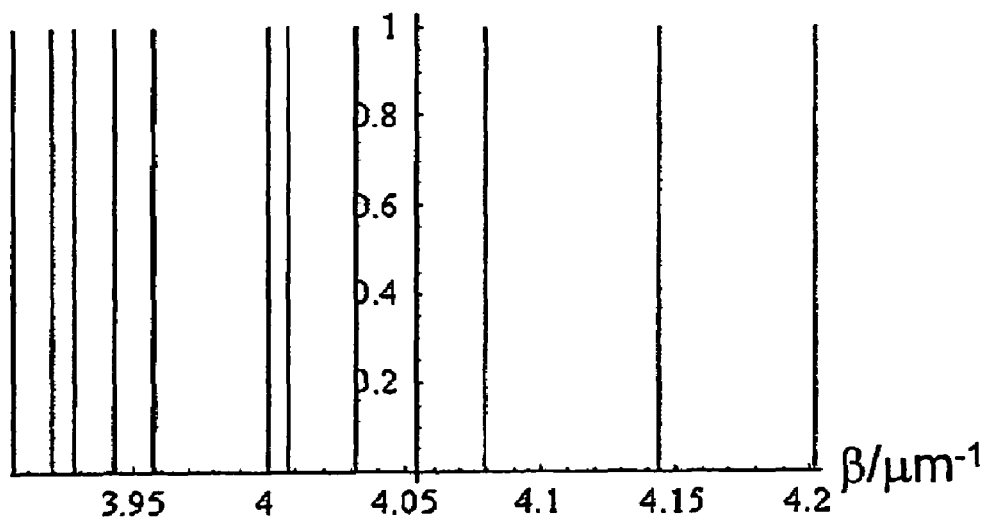
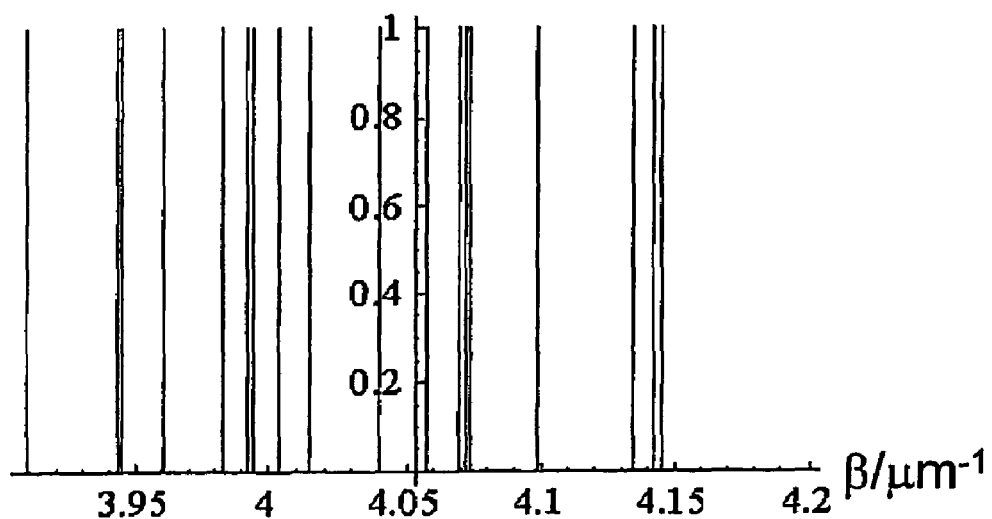
*Figure 6*

PHOTONIC BANDGAP OPTICAL WAVEGUIDE WITH ANTI-RESONANT CORE BOUNDARY

This disclosure is based upon British Application No. 0306593.5, filed Mar. 21, 2003, British Application No. 0306606.5, filed Mar. 21, 2003, British Application No. 0321991.2, filed Sep. 19, 2003, British Application No. 0322024.1, filed Sep. 19, 2003, and International Application No. PCTIGB2004/001251, filed Mar. 22, 2004, the contents of which are incorporated herein by reference.

The present invention is in the field of optical waveguides and relates in particular, but not exclusively, to optical waveguides that guide light by virtue of a photonic bandgap.

Optical fibre waveguides, which are able to guide light by virtue of a so-called photonic bandgap (PBG), were first proposed in 1995.

In, for example, "Full 2-D photonic bandgaps in silica/air structures", Birks et al., Electronics Letters, 26 Oct. 1995, Vol. 31, No. 22, pp. 1941-1942, it was proposed that a PBG may be created in an optical fibre by providing a dielectric cladding structure, which has a refractive index that varies periodically between high and low index regions, and a core defect in the cladding structure in the form of a hollow core. In the proposed cladding structure, periodicity was provided by an array of air holes that extended through a silica glass matrix material to provide a PBG structure through which certain wavelengths of light could not pass. It was proposed that light coupled into the hollow core defect would be unable to escape into the cladding due to the PBG and, thus, the light would remain localised in the core defect.

It was appreciated that light travelling through a hollow core defect, for example filled with air or even under vacuum, would suffer significantly less from undesirable effects, such as non-linearity and loss, compared with light travelling through a solid silica or doped silica fibre core. As such, it was appreciated that a PBG fibre may find application as a transmission fibre to transmit light between a transmitter and a receiver over extremely long distances, for example under the Atlantic Ocean, without undergoing signal regeneration, or as a high optical power delivery waveguide. In contrast, for standard index-guiding, single mode optical fibre, signal regeneration is typically required approximately every 80 kilometres.

The first PBG fibres that were attempted by the inventors had a periodic cladding structure formed by a triangular lattice of circular air holes embedded in a solid silica matrix and surrounding a central air core defect. Such fibres were formed by stacking circular or hexagonal capillary tubes, incorporating a core defect into the cladding by omitting a single, central capillary of the stack, and then heating and drawing the stack, in a one or two step process, to form a fibre having the required structure.

International patent application PCT/DK99/00193 describes various PBG fibre structures, for example having a cladding region based on a honeycomb lattice with a central air core. The air core is the same size as holes in the cladding region. The structure of the cladding produces a PBG and the air core, which creates a defect in the cladding, enables light to be guided in the glass in the locality of the air core.

International patent application PCT/GB00/01249 (The Secretary of State for Defence, UK), filed on 21 Mar. 2000, proposed the first PBG fibre to have a so-called seven-cell core defect, surrounded by a cladding comprising a triangular lattice of air holes embedded in an all-silica matrix. The core defect was formed by omitting an inner capillary and, in addition, the six capillaries surrounding the inner capillary, from a preform used to make the fibre. This fibre structure was seen to guide one or two modes in the core defect, in contrast to the previous, single-cell core defect fibre, which appeared not to support any guided modes in the core defect.

According to PCT/GB00/01249, it appeared that the single-cell core defect fibre, by using analogous calculations to the density-of-states calculations of solid-state physics, would only support approximately 0.23 modes. That is, it was not surprising that the single-cell core defect fibre appeared to support no guided modes in its core defect. In contrast, based on the seven-fold increase in core defect area (increasing the core defect radius by a factor of $\sqrt{7}$), the seven-cell core defect fibre was predicted to support approximately 1.61 spatial modes in the core defect. This prediction was consistent with the finding that the seven-cell core defect fibre did indeed appear to support at least one guided mode in its core defect.

A preferred fibre in PCT/GB00/01249 was described as having a core defect diameter of around 15 μm and an air-filling fraction (AFF)—that is, the proportion by volume of air in the cladding—of greater than 15% and, preferably, greater than 30%.

In "Analysis of air-guiding photonic bandgap fibres", Optics Letters, Vol. 25, No. 2, Jan. 15, 2000, Broeng et al. provided a theoretical analysis of PBG fibres. For a fibre with a seven-cell core defect and a cladding comprising a triangular lattice of near-circular holes, providing an AFF of around 70%, the structure was shown to support one or two air guided modes in the core defect. This was consistent with the finding in PCT/GB00/01249.

In the chapter entitled "Photonic Crystal Fibers: Effective Index and Band-Gap Guidance" from the book "Photonic Crystal and Light Localization in the $21^{st}$ Century", C. M. Soukoulis (ed.), ©2001 Kluwer Academic Publishers, the authors presented further analysis of PBG fibres based primarily on a seven-cell core defect fibre. The optical fibre was fabricated by stacking and drawing hexagonal silica capillary tubes. The authors suggested that a core defect must be large enough to support at least one guided mode but that, as in conventional fibres, increasing the core defect size would lead to the appearance of higher order modes. The authors also went on to suggest that there are many parameters that can have a considerable influence on the performance of bandgap fibres: choice of cladding lattice, lattice spacing, index filling fraction, choice of materials, size and shape of core defect, and structural uniformity (both in-plane and along the axis of propagation).

WO 02/075392 (Corning, Inc.) identifies a general relationship in PBG fibres between the number of so-called surface modes that exist at the boundary between the cladding and core defect of a PBG fibre and the ratio of the radial size of the core defect and a pitch of the cladding structure, where pitch is the centre to centre spacing of nearest neighbour holes in the triangular lattice of the exemplified cladding structure. It is suggested that when the core defect boundary, together with the photonic bandgap crystal pitch, are such that surface modes are excited or supported, a large fraction of the "light power" propagated along the fibre is essentially not located in the core defect. Accordingly, while surface states exist, the suggestion was that the distribution of light power is not effective to realise the benefits associated with the low refractive index core defect of a PBG crystal optical waveguide. The mode energy fraction in the core defect of the PBG fibre was shown to vary with increasing ratio of core defect size to pitch. In other words, it was suggested that the way to increase mode energy fraction in the core defect is by decreasing the number of surface modes, in turn, by selecting an appropriate ratio of the radial size of the core defect and a pitch of the cladding structure. In particular, WO 02/075392 states that, for a circular core structure, a ratio of core radius to pitch of around 1.07 to 1.08 provides a high mode power fraction of not less than 0.9 and the structure is single mode guiding. Other structures are considered, for example in FIG. 7 therein, wherein the core defect covers an area equivalent to 16 cladding holes.

The reason why varying the ratio of the radial size of the core defect and a pitch of the cladding structure affects the nature of the surface modes supported by a PBG fibre can be explained with reference to the book "Photonic Crystals: Molding the Flow of Light", Joannopoulos et al., Princeton University Press, ISBN 0-691-03744. The text describes in detail the nature of surface modes and, in particular, the reasons why they form at an interface between a PBG structure and a defect (or other termination of the PBG structure). In brief, surface modes occur when there are electromagnetic modes near the surface, but they are not permitted to extend into the PBG crystal at the respective frequency due to the PBG. The book goes on to describe that the characteristics, and indeed the presence at all, of the surface modes can be tuned by varying the termination position of the PBG structure. For example, a PBG structure that terminates by cutting through air holes has different surface mode characteristics than the same PBG structure that terminates by cutting through only solid material around holes. WO 02/075392 is consistent with this since varying the core defect size of a PBG fibre naturally varies the termination position of the PBG structure.

In a Post-deadline paper presented at ECOC 2002, "Low Loss (13 dB) Air core defect Photonic Bandgap Fibre", N. Venkataraman et al. reported a PBG fibre having a seven-cell core defect that exhibited loss as low as 13 dB/km at 1500 nm over a fibre length of one hundred metres. The structure of this fibre closely resembles the structure considered in the book chapter referenced above. The authors attribute the relatively small loss of the fibre as being due to the high degree of structural uniformity along the length of the fibre.

More recently, the present applicant has presented a post-deadline paper at OFC 2004: "Low loss (1.7 dB/km) hollow core photonic bandgap fiber", Mangan et al. This paper reports the lowest loss result ever achieved by a PBG fibre and goes on to propose that scaling the fibre to operate at a longer wavelength should reduce loss even further. In conventional state-of-the-art solid silica fibers, attenuation is dominated by Rayleigh scattering and multi-phonon absorption at short and long wavelengths, respectively, resulting in an attenuation minimum at around 1550 nm. In hollow-core PBG fibres most of the light does not travel in glass, and therefore the effects of Rayleigh scattering and multi-phonon absorption in the bulk material are significantly reduced, while the internal surfaces of the fiber become a potentially much more important contributor to loss. Theoretical considerations indicate that the attenuation due to mode coupling and scattering at the internal air/glass interfaces, which dominate the loss in the fiber reported, should scale with the wavelength $\lambda$ as $\lambda^{-3}$. This was confirmed by the empirical data showing the minimum loss of hollow-core PBG fibres designed for various operating wavelengths in a wavelength range where IR absorption is negligible. It is likely that silica hollow-core PBG fibres will achieve their lowest loss somewhere in the 1800-2000 nm wavelength range, well beyond the wavelength at which bulk silica assumes its minimum loss. An alternative kind of PBG fibre, which does not have a cladding comprising a lattice of high and low refractive index regions, is described in WO00/22466. These PBG fibres typically comprise, in a transverse cross section, concentric, increasingly large, annuli of varying high and low refractive index material, which create an omni-directional reflector capable of confining light to a core region of the fibre.

PBG fibre structures are typically fabricated by first forming a pre-form and then heating and drawing an optical fibre from that pre-form in a fibre-drawing tower. It is known either to construct a pre-form by stacking capillaries and fusing the capillaries into the appropriate configuration of pre-form, or to use extrusion.

For example, in PCT/GB00/01249, identified above, a seven-cell core defect pre-form structure was formed by omitting from a stack of capillaries an inner capillary and, in addition, the six capillaries surrounding the inner capillary. The capillaries around the core defect boundary in the stack were supported during formation of the pre-form by inserting truncated capillaries, which did not meet in the middle of the stack, at both ends of the capillary stack. The stack was then heated in order to fuse the capillaries together into a pre-form suitable for drawing into an optical fibre. Clearly, only the fibre drawn from the central portion of the stack, with the missing inner seven capillaries, was suitable for use as a hollow core defect fibre.

US patent application number U.S. Pat. No. 6,444,133 (Corning, Inc.), describes a technique of forming a PBG fibre pre-form comprising a stack of hexagonal capillaries in which the inner capillary is missing, thus forming a core defect of the eventual PBG fibre structure that has flat inner surfaces. In contrast, the holes in the capillaries are round. U.S. Pat. No. 6,444,133 proposes that, by etching the entire pre-form, the flat surfaces of the core defect dissolve away more quickly than the curved surfaces of the outer capillaries. The effect of etching is that the edges of the capillaries that are next to the central defect fully dissolve, while the remaining capillaries simply experience an increase in hole-diameter. Overall, the resulting pre-form has a greater fraction of air in the cladding structure and a core defect that is closer to a seven-cell core defect than a single cell core defect.

PCT patent application number WO 02/084347 (Corning, Inc.) describes a method of making a pre-form comprising a stack of hexagonal capillaries of which the inner capillaries are preferentially etched by exposure to an etching agent. Each capillary has a hexagonal outer boundary and a circular inner boundary. The result of the etching step is that the centres of the edges of the hexagonal capillaries around the central region dissolve more quickly than the corners, thereby causing formation of a core defect. In some examples, the circular holes are offset in the inner hexagonal capillaries of the stack so that each capillary has a wall that is thinner than its opposite wall. These capillaries are arranged in the stack so that their thinner walls point towards the centre of the structure. An etching step, in effect, preferentially etches the thinner walls first, thereby forming a seven-cell core defect.

In arriving at the present invention, the inventors have appreciated and demonstrated that, while the size of a core defect is significant in determining certain characteristics of a PBG waveguide, the form of a boundary at the interface between core and cladding also plays a significant role in determining certain characteristics of the waveguide. By way of example, as will be described in detail hereafter, the inventors have shown that, for given PBG core and cladding structures, variations in only the thickness of the boundary, at the interface between the core and cladding, can cause significant changes in the characteristics of a respective waveguide.

comprising:

a core, comprising an elongate region of relatively low refractive index;

a photonic bandgap structure arranged to provide a photonic bandgap over a range of wavelengths of light including an operating wavelength of light, the structure, in a transverse cross section of the waveguide, surrounding the core and comprising elongate relatively low refractive index regions interspersed with elongate relatively high refractive index regions; and a relatively high refractive index boundary at the interface between the core defect and the photonic bandgap structure, the boundary having a thickness around the core such that the boundary is substantially anti-resonant at the operating wavelength of light.

It has been widely reported that light may be guided in a PBG fibre by virtue of a cladding which provides a PBG. It has also been reported by Litchinitser et al., Opt Lett., Vol. 27 (2002) pp. 1592-1594, that light may be guided in a PBG-like fibre predominantly by anti-resonant reflection in multiple cladding layers, similar to the aforementioned concentric structure. Litchinitser et al. describe a fibre structure comprising a low index core surrounded by plural concentric layers of high and low index material, the relative thicknesses of which were chosen to provide an anti-resonant cladding structure for confining light to the core region. Litchinitser et al. also disclose a fibre structure consisting of a silica core surrounded by holes filled with high index liquid. In that case the silica represents the low index medium and the filled holes are the features that act as resonators. It was suggested that, at their anti-resonant wavelengths, the filled holes could substantially exclude light and thus confine light to the relatively low-index silica core. It was also stated that numerical simulations on such a structure were very time consuming and so the study was limited to the concentric ring structure.

In order to understand the effects of resonance and anti-resonance in optical structures it is instructive to first consider a simple example of an optical resonator such as a Fabry-Perot interferometer. Whether or not light can resonate in such a feature depends on the feature's size, shape and composition, and also on the wavelength and direction of propagation of the light. As the wavelength is varied the feature moves into and out of resonance. For a given excitation, on resonance, the optical power in the features assumes a maximum. In between resonances, optical power in the features is minimised. If the relatively low refractive index regions are air, it is desirable to maximise the amount of light in these regions in order to reduce scattering, non-linearities and other deleterious effects. That is advantageous as it raises the proportion of light in the low-index regions and decreases F-factor (described hereinafter), which is a measure of the amount of light at glass/air interfaces. Hence it is advantageous to incorporate features that possess strong distinct resonances, and adjust their sizes and shapes so that they are anti-resonant at the optical wavelengths and directions of propagation of interest.

The present inventors have discovered that confinement of light to a core of a PBG fibre, which confines light to the core region by virtue of a photonic bandgap, may be enhanced by providing, at the interface between the core and the photonic bandgap cladding, a boundary which is tuned to be substantially anti-resonant. Unlike in Litchinitser et al., in which anti-resonance is achieved using concentric layers of material or distinct, unconnected resonators, a core boundary proposed herein may comprises a single, unbroken region of relatively high refractive index at the interface between the core and the photonic bandgap structure. The present inventors have discovered that such a core boundary can be arranged to be anti-resonant at an operating wavelength, and thereby serve to confine light to the core of the waveguide. The present inventors have also discovered that it is possible to achieve a similar confinement of light to a core by arranging plural anti-resonant features around an unbroken, but otherwise generally non-anti-resonant, core boundary. This latter kind of confinement, while being closely related to the former kind, is described more fully in applicants co-pending International Patent Application entitled "Improvements in and relating to optical waveguides", having the same filing date and earliest priority date as the present application (the entire teaching of that application is hereby incorporated herein by reference).

The boundary may have a different structure from the structure of the rest of the photonic band-gap structure. For example, boundary may comprise thicker or thinner regions than those corresponding to regions in the rest of the structure. The regions of relatively high refractive index may include nodes that are in different positions or have different sizes from corresponding features in the rest of the structure. The boundary may comprise, or include a region of, a different refractive index than the relatively high refractive index regions in the photonic band-gap cladding structure.

Considering, for example, an air-core and silica PBG fibre, the inventors have determined that the geometry of the region of the boundary between the air core and the photonic bandgap cladding structure has profound effects on the modal properties of the fibre. In particular, the inventors have appreciated that the number of guiding modes within the band gap, the fraction of the light power of the guided modes confined within the air core and the field intensity of these modes at the air-silica interfaces all vary sensitively with the geometry within the region. In particular, the inventors have shown that, by tailoring the geometry, the properties of an $LP_{01}$-like mode (when present), which possesses an approximately Gaussian intensity profile towards the centre of the core, can be tailored so that up to and even over 99% of the light is confined within air, and predominantly in the core. This implies that loss due to Rayleigh scattering in the silica may be suppressed by up to two orders of magnitude and that nonlinearity may be substantially reduced compared with standard index guiding single mode fibre. Also, the inventors have demonstrated that the core boundary geometry can be designed to reduce the field intensity of this mode strongly in the vicinity of the air-silica interfaces. This has the effect of reducing both the small scale interface roughness scattering, which is discussed in detail hereafter, and the mode coupling due to longer range fibre variations.

The inventors have determined that the design of a core-cladding interface, or boundary region, can exploit an anti-resonance effect to strongly enhance the power in air fraction, $\eta$, and reduce the field intensity at the air-silica interfaces of core-guided modes, such as the $LP_{01}$-like mode. As has already been stated, the inventors have found that the geometry giving rise to the anti-resonance can be based either on a continuous silica boundary layer encircling the air core, such as in the example shown in FIG. 1, or on a number of localised regions of silica existing around the core boundary, such as in the example shown in FIG. 2.

Antiresonant boundaries have also been found, in at least some embodiments, to have the benefit of reducing the effects of, or even removing, so-called surface modes that can exist at a core boundary and potentially interfere with the core-guided modes. This is particularly surprising given that, as already mentioned, the respective core boundaries do not typically match the form of the cladding.

The inventors suggest that the mechanism by which an anti-resonance of a continuous core surround can occur may be understood by considering a circular tube of silica of constant thickness t and mean radius R, of the inner and outer silica/air interfaces, surrounded by air, as shown in FIG. 3. The properties of this system can be analysed exactly by expressing the fields in regions I, II and III in terms of Bessel functions using known techniques. The cylindrical symmetry implies that modes decouple according to an integer m, which governs the azimuthal variation of the fields around the tube. An eigenvalue equation for each m may be generated by applying electromagnetic boundary conditions at the dielectric interfaces and the guiding and leaky modes of the structure may be readily obtained from the solutions to the eigenvalue equations. The guided modes, which are concentrated in the silica, satisfy $Re[\beta] > \omega/c$, $Im[\beta] = 0$. The leaky modes require analytic continuation to complex $\beta$ values; only solutions which possess small imaginary $\beta$ components are retained. At low values of m, $Re[\beta] \approx \omega/c$ for the leaky mode solutions and lies close to and just below the air light-line value $Re[\beta] < \omega/c$. At high values of m, low loss leaky "whispering gallery" modes, concentrated in or near the core boundary, can exist further from the light line in rings of sufficiently large radius and thickness.

The leaky air modes can be labelled in an analogous way to the guided modes of standard index guiding optical fibres. Of particular interest is the $LP_{01}$-like leaky mode, which is the analogue of the fundamental mode of a standard telecommunications fibre. The $LP_{01}$-like mode is found to have a concentration of light power within the central hole of the tube and has an approximately Gaussian field intensity profile close to the centre of the hole. The $\beta$-value of this mode lies close to the air light line, so that the air-silica interfaces act as strong reflectors of the light. This gives rise to strong confinement, as evidenced by the small value of $Im[\beta]$ associated with the mode. The $LP_{01}$-like leaky mode confinement, for a given tube radius R, is found to be strongly dependent upon the thickness t.

FIGS. 4a and 4b respectively show the linear and logged dependence of $Im[\beta]$ on tube wall thickness t, for mean tube radii of 6 μm and 9 μm and an operating wavelength $\lambda = 1.55$ μm. A tube radius of 6 μm is close in size to the core radius of a seven-cell core defect fibre described herein and a tube radius of 9 μm is close in size to the core radius of a nineteen-cell core defect fibre described herein, when both are configured to guide light at 1.55 μm. The broad minimum occurring around $t = 0.4$ μm, which is most apparent on the linear plot in FIG. 4a, is believed to be due to an anti-resonance phenomenon. Clearly, the minimum is significantly lower for the 9 μm tube, which indicates that the larger diameter tube is better able to confine light at this wavelength to the core. Destructive interference occurs for (Hankel) waves which are multiply reflected at the dielectric interfaces. The round-trip phase accumulated by a wave that emanates from the inner interface, propagates outwards to the outer interface, reflects and propagates inwards to the inner interface and is again reflected, is close to $\pi$. More generally, anti-resonances occur around thickness values giving rise to a round-trip phase given by $(2n+1)\pi$, where n is an integer satisfying $n \geq 0$. For example, in a silica and air system, for tube radii satisfying $R \gg \lambda$ (where $\lambda$ is the operating wavelength), the thickness t which gives rise to anti-resonance is determined from $$t = \frac{\lambda}{4\sqrt{n_{sil}^2 - 1}} (2n + 1), \qquad (1)$$

where $n_{sil}$ is the refractive index of silica. As can be seen, t is independent of the radius R. In this regime, the boundaries are acting as locally planar interfaces. More generally still, anti-resonances lie between resonances, which in this case occur at $$t \approx \frac{\lambda}{4\sqrt{n_{sil}^2 - 1}} 2n, \, n \geq 1. \qquad (2)$$

where n is an integer. At resonances, the field is maximised within the silica of the tube.

Equations (1) and (2), relate specifically to silica and air systems, although they can be generalised to describe other material and air systems by replacing $n_{sil}$ with the refractive index of the respective material. Clearly, the position and scale of the graph in FIG. 4, and respective thickness values for resonance and anti-resonance, vary as the material refractive index and operating wavelength vary. For example, as the material refractive index increases, the curve in FIG. 4 would contract and shift to the left; with respective thickness values decreasing. Conversely, if the operating wavelength increases, the curve in FIG. 4 would expand and shift to the right; with respective thickness values increasing.

The equations can be generalised for two materials having respective refractive indices $n_{HI}$, and $n_{LO}$, according to $$t = \frac{\lambda}{4\sqrt{n_{HI}^2 - n_{LO}^2}} (2n + 1) \qquad (3)$$

for anti-resonance and, for resonance $$t \approx \frac{\lambda}{4\sqrt{n_{HI}^2 - n_{LO}^2}} (2n), \, n \geq 1 \qquad (4)$$

In this case, it will be appreciated that the equations depend on both $n_{HI}$ and $n_{LO}$, rather than the relatively high refractive index alone. The skilled person will appreciate that equations (3) and (4) may be modified to describe resonance and anti-resonance in systems where the tube comprises plural concentric constituent layers, or shells, for example a high refractive index outer shell and a lower refractive index inner shell. Such a structure may be useful for tuning the reflectivity of the inner or outer surface of the overall tube, for example, in order to equalise the reflectivities of the tube surfaces incident with core and cladding regions. Even more complex structures than this are envisaged. The skilled person will be able, if required, to adapt the foregoing equations to describe the resonance and anti-resonance properties of such structures.

In some embodiments of the present invention, the operating wavelength may be at or near 1550 nm. The operating wavelength may be lower, for example at or near to 800 nm, 1060 nm or 1300 nm. Alternatively, the operating wavelength may be higher, for example in the range 1800 nm-2000 nm, in the range 2-5 µm (for example, for mid IR spectroscopy), or even at or near 10.6 µm (for example, for transmitting light from a $CO_2$ laser).

Silica glass is not so optically transparent at wavelengths of light above about 2 µm. For transmission at the longer wavelengths, therefore, it would be preferable to use a material that is optically transparent at the wavelengths of interest. Typically, glasses such as chalcogenides or tellurite, can have refractive indices in the region of 2.4 and above and can be optically transparent at wavelengths above 2 µm. Of course, use of such high index glasses has a significant impact on Equations (1)-(4), and waveguide core boundary structures would need to be scaled according to the equations to be anti-resonant.

FIG. 5 shows the mode field intensity I of the $LP_{01}$-like leaky mode for a tube with mean radius R=6 µm, thickness t=0.392 µm and wavelength 1.55 µm, which corresponds to the exact anti-resonance minimum. Of course, to benefit from anti-resonance, it is not necessary to operate at exact anti-resonance. Indeed, there is a broad range between resonance peaks where a waveguide benefits from a boundary tuned to have some degree of anti-resonance. It can be seen that a near null appears very close to the inner dielectric interface and that the intensity at the outer interface is 22 dB lower than the intensity at the centre of the hole. This field suppression at the interfaces is a feature of anti-resonance. Exploitation of the anti-resonance phenomenon both maximises the confinement of the LP01-like leaky mode and largely minimises the field at the boundaries and hence the interface roughness scattering (discussed below). Of course, any well-confined, leaky mode in the core, for example a $TE_{01}$-like mode, would benefit in the same way as the $LP_{01}$-like mode.

FIG. 6 shows plots of the mode spectra of an anti-resonant tube of radius R=6 µm and t=0.392 µm, including all guided modes and leaky modes within $\Delta\beta=0.15$ µm$^{-1}$ of the air light line at $\lambda$=1.55 µm (i.e. at $\beta=2\pi/1.55$), and compares it with the spectrum for a thinner silica ring of thickness t=0.1 µm, which is the approximate thickness of a cladding structure vein according to a preferred structure, as described hereinafter. This range of $\beta$ is chosen to correspond to the band-gap width of a typical PBG fibre cladding. It is seen that within this region, the thicker anti-resonant tube actually possesses a smaller number of modes than the thinner one. The interface field intensity reduction and the mode number reduction implies that mode coupling effects, due to fluctuations on a length scale exceeding about 20 µm, can be expected to be lower for a thicker anti-resonant boundary than a thinner one.

The inventors have applied the foregoing principles to a numerical investigation of continuous core surrounds, or boundaries, having shapes that are more easily fabricated in practice, for example a dodecagonal boundary as shown in FIG. 7. The results are compared herein with the circular geometry.

At least initially, the boundary may be considered in the absence of any cladding material; it is taken to be bounded by air. The dodecagonal boundary, which is a natural core surround shape in PBG fibres manufactured using stacked silica tubes, as will be described hereinafter, is found to possess a $LP_{01}$-like leaky mode which shows an anti-resonance effect almost identical with that of a circular tube of the same mean radius. The confinement of this mode is found to be only very slightly compromised by the sharp corners associated with this geometry. A near null of the field intensity again occurs very close to the inner dielectric interface. The thickness at anti-resonance of this shape is very close to that of the circular tube. The number of guided and leaky modes of this shape at anti-resonance is found to be similar to that of the tube over the PBG region, although modes possessing faster azimuthal variation (high effective m) are shifted significantly by the change in geometry and the confinement of leaky modes with high effective m is reduced by the appearance of corners.

The inventors have considered full PBG fibre geometries, as shown in FIGS. 8a and 8b, with band gap cladding material surrounding a continuous core boundary. It is found that the anti-resonance phenomenon associated with the continuous core surround occurs for these structures also. This is evidenced by scanning over boundary thickness t and numerically calculating the $LP_{01}$-like mode solutions.

As a function of t, broad maxima in the fraction η of the light power in air are observed, together with broad minima in F-factor (described below), which measures field intensity at the dielectric interfaces and gives a direct relative measure of the strength of small scale interface roughness scattering and provides an indication of the relative strength of mode coupling effects due to longer scale fluctuations.

In fact, the thickness for anti-resonance for the core surround bounded by air can be used as an indication of the boundary thickness required for anti-resonance in the PBG fibre geometry, as will be demonstrated. The thickness t at anti-resonance for the latter geometry is found to be a little lower than for the former one. This difference is believed to be a function of the silica associated with the PBG cladding structure, which connects onto the outer surface of the boundary. In other words, the boundary has an 'effective thickness', which is typically greater than the actual thickness, where effective thickness will vary depending on the form of the cladding which meets the outer surface of the boundary. Furthermore, examination of the mode field intensity of the $LP_{01}$-like mode shows that near nulls appear close to the inner surface of the boundary in the PBG fibre at maximum η and minimum F-factor, just as they do for the core surround in air at anti-resonance. This confirms the anti-resonance mechanism for PBG fibre geometry. Hence, F-factor, η and anti-resonance are proxies for one another in that determining any one provides specific information about the other two.

According to a second aspect, the present invention provides an optical waveguide, comprising:

a core, comprising an elongate region of relatively low refractive index;

a photonic bandgap structure arranged to provide a photonic bandgap over a range of wavelengths of light, the structure, in a transverse cross section of the waveguide, surrounding the core and comprising elongate relatively low refractive index regions interspersed with elongate relatively high refractive index regions; and a relatively high refractive index boundary at the interface between the core defect and the photonic bandgap structure, the boundary having a thickness around the core such that, in use, light guided by the waveguide is guided in a transverse mode in which, in the transverse cross-section, more than 95% of the guided light is in the regions of relatively low refractive index in the waveguide.

As indicated, guiding light in a region of relatively low refractive index has the advantage that losses, nonlinear effects and other material effects are generally lower in such regions, particularly if the region is a region of air or a gas. Thus, preferably in the transverse cross-section, ever more of the light may be guided in the regions of relatively low refractive index in the PBG structure and the core: preferably more than 96%, 97%, 98%, 99%, 99.3%, 99.5% or even 99.9% of the light is in those regions.

The boundary may have a thickness such that, in use, light guided by the waveguide is guided in a transverse mode in which, in the transverse cross-section, more than 50% of the guided light is in the region of relatively low refractive index in the core. It is significant that the inventors have recognised that the light need not be in the core region for beneficial effects to be achieved. Thus, the boundary may have a shape such that, in use, light guided by the waveguide is guided in a transverse mode in which, in the transverse cross-section, more than 1% of the guided light is in the regions of relatively low refractive index in the photonic bandgap structure. It may be that still more of the guided light is in those regions in the PBG structure: more than 2%, more than 5% or even more than 10% of the light may be in those regions.

The boundary may have a thickness such that, in use, light guided by the waveguide is guided in a transverse mode providing an F-factor of less than 0.23 µm$^{-1}$ for an operating wavelength of 1.55 µm, less than an equivalent F-factor value scaled for a different operating wavelength (given by the formula F=0.23*(1.55/($\lambda$/µm$^{-1}$))/µm$^{-1}$, where $\lambda$ is the operating wavelength) or less than 0.7$\Lambda^{-1}$ for structures having a periodic cladding with a pitch $\Lambda$.

F-factor has been identified by the present inventors as a useful figure of merit which relates to how the guided light propagating in a PBG fibre is subject to scattering from small scale irregularities of the air-silica interfaces. F-factor is also believed to be a strong indicator of likely mode-coupling characteristics of a PBG-fibre. The relevant F-factor is typically the F-factor only of the mode of interest (for example, the fundamental mode, ignoring higher-order modes).

Scattering due to small scale irregularities acts in addition to the Rayleigh scattering due to index inhomogeneity within silica, or any other such optical guiding medium. The latter loss mechanism is strongly suppressed in air-core PBG fibres, if most of the light power is in air. It remains to ascertain the limit that hole interface scattering places on loss, given that some interface roughness is always present. The amount of scattering associated with air-silica boundaries can be minimised by ensuring that impurities are eliminated during the draw process; such impurities can act as scattering (and absorption) centres directly, and can operate as nucleation sites for crystallite formation. With these imperfections removed, there still remains interface roughness governed by the thermodynamics of the drawing process. The inventors believe that such fluctuations are likely to be difficult or impossible to remove altogether.

The Rayleigh scattering due to small scale roughness at the air-silica interfaces may be calculated by applying a perturbation calculation. The analysis has a simple interpretation in terms of effective particulate scatterers distributed on the interfaces. If the root-mean square (RMS) height roughness is $h_{rms}$ and the correlation lengths of the roughness along the hole direction and around the hole perimeter are $L_z$ and $L_\Phi$ respectively, then a typical scatterer has a volume $h_{rms}L_zL_\Phi$. The induced dipole moment of the typical scatterer is then given by $$p = \Delta \varepsilon E_0 h_{rms} L_z L_\Phi \qquad (5)$$

where $\Delta \varepsilon$ is the difference in dielectric constant between silica and air, and $E_0$ is the E-field strength at the scatterer. This induced dipole moment radiates a power, in the free space approximation, given by $$P_{sc} = \frac{1}{12\pi}\left(\frac{\omega}{c}\right)^4 \left(\frac{\varepsilon_0}{\mu_0}\right)^{1/2}|p|^2 = \frac{1}{12\pi}\left(\frac{\omega}{c}\right)^4 \Delta\varepsilon^2 h_{rms}^2 L_z^2 L_\Phi^2 \left(\frac{\varepsilon_0}{\mu_0}\right)^{1/2}|E_0|^2. \qquad (6)$$

The number density of particles on the interface will be $\sim 1/(L_zL_\Phi)$ so that the total radiated power from a section of length L of the perturbed fibre will be approximately $$P_{rad} \sim \frac{1}{12\pi}\left(\frac{\omega}{c}\right)^4 \Delta\varepsilon^2 h_{rms}^2 L_z L_\Phi L \left(\frac{\varepsilon_0}{\mu_0}\right)^{1/2} \oint_{\substack{pole \\ perimeters}} ds |E_0|^2 \qquad (7)$$

The loss rate is thus given by $$\gamma = \frac{P_{rad}}{P_0 L} \sim \frac{1}{6\pi}\left(\frac{\omega}{c}\right)^4 \Delta\varepsilon^2 h_{rms}^2 L_z L_\Phi \left(\frac{\varepsilon_0}{\mu_0}\right)^{1/2} \frac{\oint_{\substack{pole \\ perimeters}} ds |E_0|^2}{\int dS(E_0 \wedge H_0^*) \cdot \hat{z}} \qquad (8)$$

where the incident power $P_0$ has been expressed as a Poynting flux.

Equation (8) shows that the mode shape dependence of the Rayleigh interface roughness scattering strength is governed by an F-factor, given by $$F = \left(\frac{\varepsilon_0}{\mu_0}\right)^{1/2} \frac{\oint_{\substack{pole \\ perimeters}} ds |E_0(r')|^2}{\int_{x-section} dS(E_0 \wedge H_0^*) \cdot \hat{z}}. \qquad (9)$$

The inventors have found that a comparison of the interface scattering strength from guided modes of different fibres with similar interface roughness properties can be based purely on the F-factor. Indeed, the thermodynamic limit to surface roughness is not expected to vary greatly with small variations in the fibre geometry, so that the F-factor can be used directly as a figure of merit for any fibre which has interfaces which cause scattering and contribute to loss.

According to a third aspect, the present invention provides an optical waveguide, comprising:

a core, comprising an elongate region of relatively low refractive index;

a photonic bandgap structure arranged to provide a photonic bandgap over a range of wavelengths of light, the structure, in a transverse cross section of the waveguide, surrounding the core and comprising elongate relatively low refractive index regions interspersed with elongate relatively high refractive index regions; and a relatively high refractive index boundary at the interface between the core defect and the photonic bandgap structure, the boundary having a thickness around the core such that, in use, light guided by the waveguide is guided in a transverse mode providing an F-factor of less than 0.231 µm$^{-1}$ for an operating wavelength of 1.55 µm, less than an equivalent F-factor value scaled for a different operating wavelength or less than $0.7\Lambda^{-1}$ for structures having a periodic cladding and a pitch $\Lambda$.

Preferably, for any of the aforementioned waveguides, still lower F-factors are provided: less than 0.17 µm$^{-1}$, less than 0.1 µm$^{-1}$, less than 0.07 µm$^{-1}$, less than 0.06 µm$^{-1}$, less than 0.05 µm$^{-1}$, less than 0.033 µm$^{-1}$, less than 0.03 µm$^{-1}$, less than 0.027 µm$^{-1}$, less than 0.023 µm$^{-1}$, less than 0.02 µm$^{-1}$, less than 0.017 µm$^{-1}$, less than 0.013 µm$^{-1}$, less than 0.01 µm$^{-1}$, less than 0.0067 µm$^{-1}$, or even less than 0.0033 µm$^{-1}$ are preferred (for an operating wavelength of 1.55 µm, (or equivalent scaled values for an alternative operating wavelength)—for a PBG fibre that has a periodic photonic bandgap structure, with a pitch $\Lambda$, these values scale inversely with pitch and become less than $0.5\Lambda^{-1}$, less than $0.3\Lambda^{-1}$, less than $0.2\Lambda^{-1}$, less than $0.17\Lambda^{-1}$, less than $0.15\Lambda^{-1}$, less than $0.10\Lambda^{-1}$, less than $0.09\Lambda^{-1}$, less than $0.08\Lambda^{-1}$, less than $0.07\Lambda^{-1}$, less than $0.06\Lambda^{-1}$ less than $0.05\Lambda^{-1}$, less than $0.04\Lambda^{-1}$, less than $0.03\Lambda^{-1}$, less than $0.02\Lambda^{-1}$, or even less than $0.01\Lambda^{-1}$ respectively. As has already been described, anti-resonance strength can be stronger for larger diameter core radii. Accordingly, core radius may be varied to meet a required F-factor; where increased radius also enables decreased F-factor.

A more rigorous calculation of small scale interface roughness can be derived which takes into account the details of the surface roughness spectrum and deviations from the free space approximation. The latter effect is embodied by a local density of states (LDOS) correction factor appearing in the integrand of the numerator integral in equation (9). Ideally, to minimise the interface loss, the field intensity of the guiding mode multiplied by the LDOS factor should be maintained as small possible at the interfaces. In practise, the LDOS correction is found to be small even for (silica/air) PBG fibres in comparison with the guided mode field intensity factor; so that the F-factor given in equation (9) may be used to compare the interface scattering strength from guided modes of different fibre designs.

The effect of the scattering from crystallites which have formed close to the air/silica interfaces can be calculated in a similar way to the geometrical roughness considered above. Assuming the number density per unit interface length and the size of the crystallites is independent of fibre design, again F-factor can be used directly to compare the interface scattering strengths.

The features next discussed may be found in embodiments of any one of the preceding three aspects of the invention (relating to anti-resonance, proportion $\eta$ of light in the relatively low refractive index regions or F-factor).

According to the second aspect of the invention, the boundary may be anti-resonant at an operating wavelength of light. Additionally, or alternatively, the boundary may be a reflector.

The boundary may have a substantially constant thickness around the core. Alternatively, the boundary may have a thickness that varies around the core. In either case, thickness variations at points where the cladding joins the boundary may be ignored for the purposes of simplified analysis. The boundary may have a thickness that varies periodically around the core.

For core boundaries that vary in thickness, the core boundary may have a thickness t around a proportion y of the boundary, where y>0.5. Indeed, y may be greater than 0.6, 0.7, 0.8, 0.9 or be substantially equal to 1.0.

In the transverse cross section, the photonic bandgap structure may comprise an array of the relatively low refractive index regions separated from one another by the relatively high refractive index regions. The array may be substantially periodic. Of course, the array need not be periodic, as described in the aforementioned paper by N. M. Litchinitser et al.

It is highly unlikely in practice that a photonic bandgap structure according to the present invention will comprise a 'perfectly' periodic array, due to imperfections being systematically or accidentally introduced into the structure during its manufacture and/or perturbations being introduced into the array by virtue of the presence of the core defect and/or boundary region. The present invention is intended to encompass both perfect and (purposely or accidentally) imperfect structures. Likewise, any reference to "periodic", "lattice", or the like herein, imports the likelihood of imperfection.

The array may be a substantially triangular array. Other arrays, of course, may be used, for example, square, hexagonal or Kagomé, to name just three.

The boundary region may comprise, in the transverse cross-section, a plurality of relatively high refractive index boundary veins joined end-to-end around the boundary between boundary nodes, each boundary vein being joined between a leading boundary node and a following boundary node, and each boundary node being joined between two boundary veins and to a relatively high refractive index region of the photonic bandgap structure.

At least some of the boundary veins may be substantially straight. In some embodiments, substantially all of the boundary veins are substantially straight. Alternatively, or additionally, at least some of the boundary veins may be bowed outwardly from, or inwardly towards, the core defect.

At least two of the higher index regions in the photonic bandgap structure may be connected to each other. Indeed, the higher index regions in the photonic bandgap structure may be interconnected.

The photonic bandgap structure may comprise an arrangement of isolated relatively low refractive index regions separated by connected regions of relatively high refractive index. The connected regions of relatively high refractive index may comprise an array of veins, each vein being connected at each end thereof to a node, which, in turn, is connected to at least two other veins. The arrangement of nodes and veins may vary from this at the inner or outer periphery of the photonic band-gap structure. Each vein may have a characteristic thickness substantially at its mid-point between the two nodes to which it is connected.

The boundary may comprise, in the transverse cross-section, a plurality of relatively high refractive index boundary veins connected end-to-end around the boundary between neighbouring boundary nodes (with no intermediate boundary nodes), each boundary vein being connected between a leading boundary node and a following boundary node, and each boundary node being connected between two boundary veins and to a relatively high refractive index region of the photonic bandgap structure. Then, each boundary vein may have a characteristic thickness substantially at the mid-point between the two boundary nodes to which it is connected. Preferably, more than a half of the boundary veins have a characteristic thickness at their mid-points, which is substantially the thinnest region along the vein.

It will be appreciated that, in practical fibres, it is difficult to control the fabrication process to achieve exact dimensions, for example, of core boundary thickness. However, as already indicated, the anti-resonance minima are quite broad, compared with resonances, which are characterised by sharp peaks at certain thicknesses of core boundary. Thus, a core boundary thickness in the region of an anti-resonance minimum, even if not exactly at the minimum, will still provide an advantage over other waveguides.

The characteristic thickness of at least one boundary vein may be at least 110% of the characteristic thickness of a plurality of the veins in the array of veins in the photonic band-gap structure. For example, the characteristic thickness of a plurality of the boundary veins may be at least 110% of the characteristic thickness of a plurality of the veins in the array of veins in the photonic band-gap structure. Indeed, the characteristic thickness of at least a majority of the boundary veins may be at least 110% of the characteristic thickness of at least a majority of the veins in the array of veins in the photonic band-gap structure.

In any event, the aforementioned boundary vein or veins may be even thicker than the aforementioned veins in the photonic band-gap structure. For example, the boundary vein or veins may be at least 120%, 140%, 160% or 180% of the characteristic thickness of the respective cladding veins. The boundary veins may be thicker still, for example, they may be at least 200%, 220%, 240% or even thicker than the characteristic thickness of the respective cladding veins.

In some embodiments of the present invention, substantially all of the boundary veins are thicker than substantially all of the veins in the photonic band-gap structure.

The boundary veins may be thinner than the veins in the photonic band-gap structure. The boundary vein or veins may be at most 90%, 80%, 60%, 40% or even thinner than the characteristic thickness of the respective cladding veins.

The array may have a characteristic primitive unit cell and a pitch $\Lambda$. For example, the pitch may be between 3 µm and 6 µm.

In a waveguide in which the photonic band-gap cladding is periodic and has a characteristic pitch $\Lambda$, the core boundary thickness may be expressed as a proportion of the pitch. For example, the boundary may have a thickness t, wherein, $t=u\Lambda$ for a proportion of the boundary y, where $u>0.06$ and $y>0.5$. For example, u may be even greater, for example $u>0.05$, 0.07, 0.09, 0.1, or 0.11. Additionally, or alternatively, y may be greater, for example $y>0.6$, 0.7, 0.8, 0.9 or may be substantially equal to 1.0.

Generally, as already described with reference to Equation (3), in determining whether a core boundary is anti-resonant, it is necessary to consider the operating wavelength of the waveguide and the refractive index contrast between the relatively high refractive index regions and the relatively low refractive index regions. Hence, it may be found convenient to express the core boundary thickness in terms of Equation (3). For example, the core boundary thickness may be characterised by t according to:

$$\frac{a\lambda}{4\sqrt{n_{HI}^2 - n_{LO}^2}} \leq t \leq \frac{b\lambda}{4\sqrt{n_{HI}^2 - n_{LO}^2}}$$

where a=0.5 and b=1.75 and $n_{HI}$ and $n_{LOW}$ are the refractive indices of the core surround and of the material within the core, respectively. Clearly, this range of thickness values is below the first-order resonance peak (m=1), which has been shown to lie at around t=0.74 µm for the aforementioned silica example. It is unlikely that core boundary thicknesses beyond the first-order resonance peak will find practical application, since the region would be thick enough to become an efficient waveguide thus negating the possible advantages of having an anti-resonant boundary. With reference to the graphs in FIG. 4, which relate to the specific case of a silica and air fibre operating at a wavelength of 1.55 µm, t is preferably in the approximate range 0.2 µm to 0.7 µm inclusive, and the curve has a minimum value at approximately 0.4 µm. Preferably, a>0.5, for example, a may be greater than or equal to 0.6, 0.7, 0.8, 0.9 or 1.0 (and b$\geq$a). Independently, or in combination, b<1.75, for example, b may be less than or equal to 1.7, 1.6, 1.5, 1.4, 1.3, 1.2, 1.1 or 1.0 (and b$\geq$a). It may be desirable to specify a core boundary thickness that is to the right or left of the anti-resonant point, in which case b$\geq$a>1.0 or a$\leq$b<1.0 respectively. In a preferred embodiment, a>0.8 and b<1.2. In a more preferred embodiment, a>0.9 and b<1.1.

It is expected that, as fabrication processes improve, it will be possible to make a core boundary very close to a desired thickness. There may be reasons for making a core boundary with a thickness which is not optimum according to a strict anti-resonance analysis. One exemplary reason may be mode crossings, which can have deleterious effects of the transmission characteristics of a fibre, as will be discussed hereinafter.

The core may have, in the transverse cross-section, an area that is significantly greater than the area of at least some of the relatively low refractive index regions of the photonic bandgap structure. The core may have, in the transverse cross-section, an area that is greater than twice the area of at least some of the relatively low refractive index regions of the photonic bandgap structure. The core may have, in the transverse cross-section, an area that is greater than the area of each of the relatively low refractive index regions of the photonic bandgap structure.

The core may have, in the transverse cross-section, a transverse dimension that is greater than the pitch $\Lambda$ of the photonic band-gap cladding.

The core may have a size that you would expect to obtain from the omission of a plurality of unit cells of the photonic band-gap structure, for example, the core may correspond to the omission of three, four, six, seven, ten, twelve or nineteen unit cells of the photonic band-gap structure. The core may correspond to the omission of more than nineteen unit cells of the photonic band-gap structure, for example thirty-seven cells.

At least some of the relatively low refractive index regions may have a refractive index of less than 2, less than 1.8, less than 1.6, less than 1.5, less than the refractive index of silica, less than 1.4, less than 1.3, less than the refractive index of typical polymer glasses (for example, less than 1.25), less than 1.2 or even less than 1.1 or even less than 1.05, or be 1. For example, at least some of the relatively low refractive index regions may comprise a solid material or may be voids filled with air or under vacuum. Alternatively, at least some of the relatively low refractive index regions may be voids filled with a liquid or a gas other than air. The region of relatively low refractive index that makes up the core may comprise the same or a different material compared with the regions of relatively low refractive index in the photonic bandgap structure.

In some embodiments, at least some of the relatively high refractive index regions comprise silica glass. The glass may be un-doped or doped with index raising or lowering dopants. As used herein 'silica' encompasses fused silica, including doped fused silica, and silicate glasses in general such as germano-silicates and boro-silicates.

In alternative embodiments of the invention the relatively high refractive index regions comprise a material other than silica. For example, it may be an inorganic glass in which multi-phonon absorption only becomes significant at wavelengths significantly longer than for silica. Exemplary inorganic glasses may be in the category of halide glasses, such as a fluoride glass, for example ZBLAN. Alternatively, the relatively high refractive index may comprise another solid material, for example an organic polymer.

The relatively low refractive index regions may make up more than 75% by volume of the photonic bandgap structure. This volume may be above 80%, for example 87.5%, or may be above 90%. Of course, in practical fibres, the photonic band-gap structure is typically surrounded by one or more outer, over-cladding layers of material, which are typically solid and do not factor in the preceding volume calculations.

The waveguide may support a mode having a mode profile that closely resembles the fundamental mode of a standard optical fibre. An advantage of this is that the mode may readily couple into standard, single mode optical fibre.

Alternatively, or in addition, the waveguide may support a non-degenerate mode. This mode may resemble a $TE_{01}$ mode in standard optical fibres.

Preferably, in either case, said mode supports a maximum amount of the mode power in relatively low refractive index regions compared with other modes that are supported by the waveguide.

According to a fourth aspect, the present invention provides an optical fibre comprising a waveguide according to any of the first three aspects of the present invention.

As will be described hereinafter, embodiments of the present invention provide an optical fibre, of the aforementioned kind, wherein the loss of the optical fibre may be less than 5 dB/km. According to a preferred embodiment of the present invention, the loss may be less than 2 db/km.

According to a fifth aspect, the present invention provides an optical fibre transmission system comprising a transmitter, a receiver and an optical fibre, according to the fourth aspect of the present invention, for transmitting light between the transmitter and the receiver.

According to a sixth aspect, the present invention provides data conditioned by having been transmitted through a waveguide or transmission system, as described above. As in any transmission system, data that is carried by the system acquires a characteristic 'signature' determined by a transfer function of the system. By characterising the system transfer function sufficiently accurately, using known techniques, it is possible to match a model of the input data, operated on by the transfer function, with real data that is output (or received) from the transmission system.

Also according to the invention there is provided a method of forming an elongate waveguide, comprising the steps:

forming a preform stack by stacking a plurality of elongate elements;

omitting, or substantially removing at least one elongate element from an inner region of the stack; and heating and drawing the stack, in one or more steps, into a waveguide of a type described above as being according to the invention.

Also according to the invention there is provided a method of forming elongate waveguide for guiding light, comprising the steps:

simulating the waveguide in a computer model, the waveguide comprising a core, comprising an elongate region of relatively low refractive index and a photonic bandgap structure arranged to provide a photonic bandgap over a range of wavelengths of light, the structure comprising elongate regions of relatively low refractive index interspersed with elongate regions of relatively high refractive index, including a boundary region of relatively high refractive index that surrounds, in a transverse cross-section of the waveguide, the core, wherein properties of the boundary region are represented in the computer model by parameters;

finding a set of values of the parameters that, according to the model, increases or maximises how much of the light guided by the waveguide is in the regions of relatively low refractive index in the waveguide; and making a waveguide using the values.

Also according to the invention, there is provided a method of forming elongate waveguide for guiding light, comprising the steps:

simulating the waveguide in a computer model, the waveguide comprising a core, comprising an elongate region of relatively low refractive index and a photonic bandgap structure arranged to provide a photonic bandgap over a range of frequencies of light, the structure comprising elongate regions of relatively low refractive index interspersed with elongate regions of relatively high refractive index, including a boundary region of relatively high refractive index that surrounds, in a transverse cross-section of the waveguide, the core wherein properties of the boundary region are represented in the computer model by parameters;

finding a set of values of the parameters that, according to the model, decreases or minimises the F-factor of the waveguide; and making a waveguide using the values.

According to a further aspect, the present invention provides a photonic crystal fibre, comprising:

an elongate, relatively low refractive index core;

an elongate photonic bandgap structure surrounding the core and comprising, in the transverse cross section, a lattice of relatively low refractive index regions separated by connected relatively high refractive index regions; and a concentric boundary region, at the interface between the core and the photonic bandgap structure, the core boundary region being generally thicker around its circumference than regions of relatively high refractive index in the photonic bandgap structure.

According to a further aspect, the present invention provides an optical waveguide comprising:

a core, comprising an elongate region of relatively low refractive index;

an outer structure, surrounding, in a transverse cross section of the waveguide, the core and comprising elongate relatively low refractive index regions interspersed with elongate relatively high refractive index regions; and a relatively high refractive index boundary at the interface between the core defect and the outer structure, the boundary having a thickness around the core such that the boundary is substantially anti-resonant at the operating wavelength of light.

The outer structure may be a photonic bandgap structure. Even if the outer structure is not a photonic bandgap structure, any features set out above in relation to other aspects of the invention having a bandgap structure may be found in the present further aspect of the invention unless that is not physically meaningful. The waveguide may comprise a jacket around the outer structure.

Other aspects and embodiments of the present invention will become apparent from reading the following description and claims and considering the following drawings.

Embodiments of the present invention will now be described, by way of example only, with reference to the accompanying drawings, of which:

FIG. 4 is a graph which shows the imaginary part of the longitudinal propagation constant β plotted as a function of tube thickness t on (a) a linear and (b) a log. y-axis scale;

FIG. 6 shows the mode spectra of silica tubes of radius R at thicknesses t=0.392 μm and t=0.1 μm;

Figure 1:
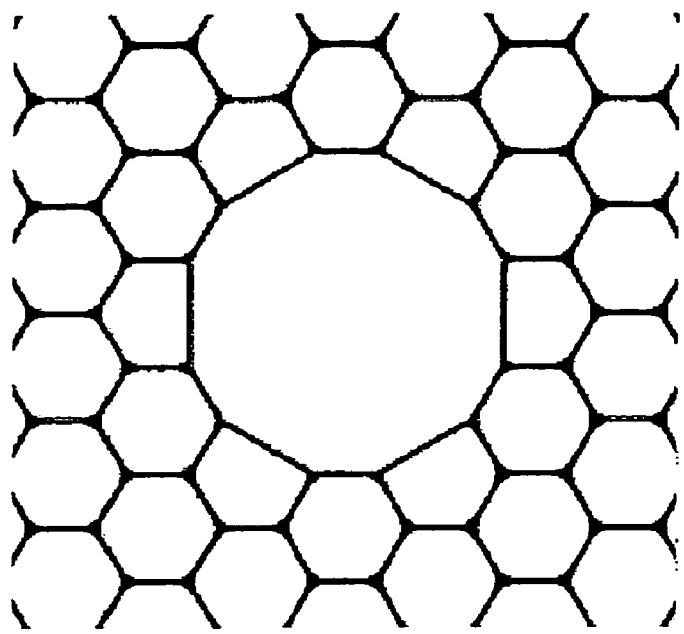
FIG. 1 is a diagram of a transverse cross section of a PBG fibre structure having a generally constant thickness core boundary.
Figure 2:
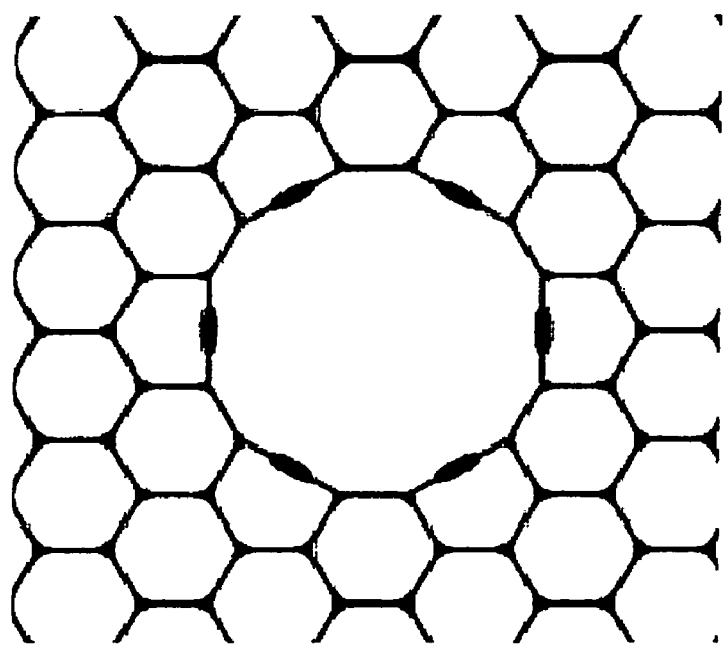
FIG. 2 is a diagram of a transverse cross section of a PBG fibre structure having a varying thickness core boundary.
Figure 3:
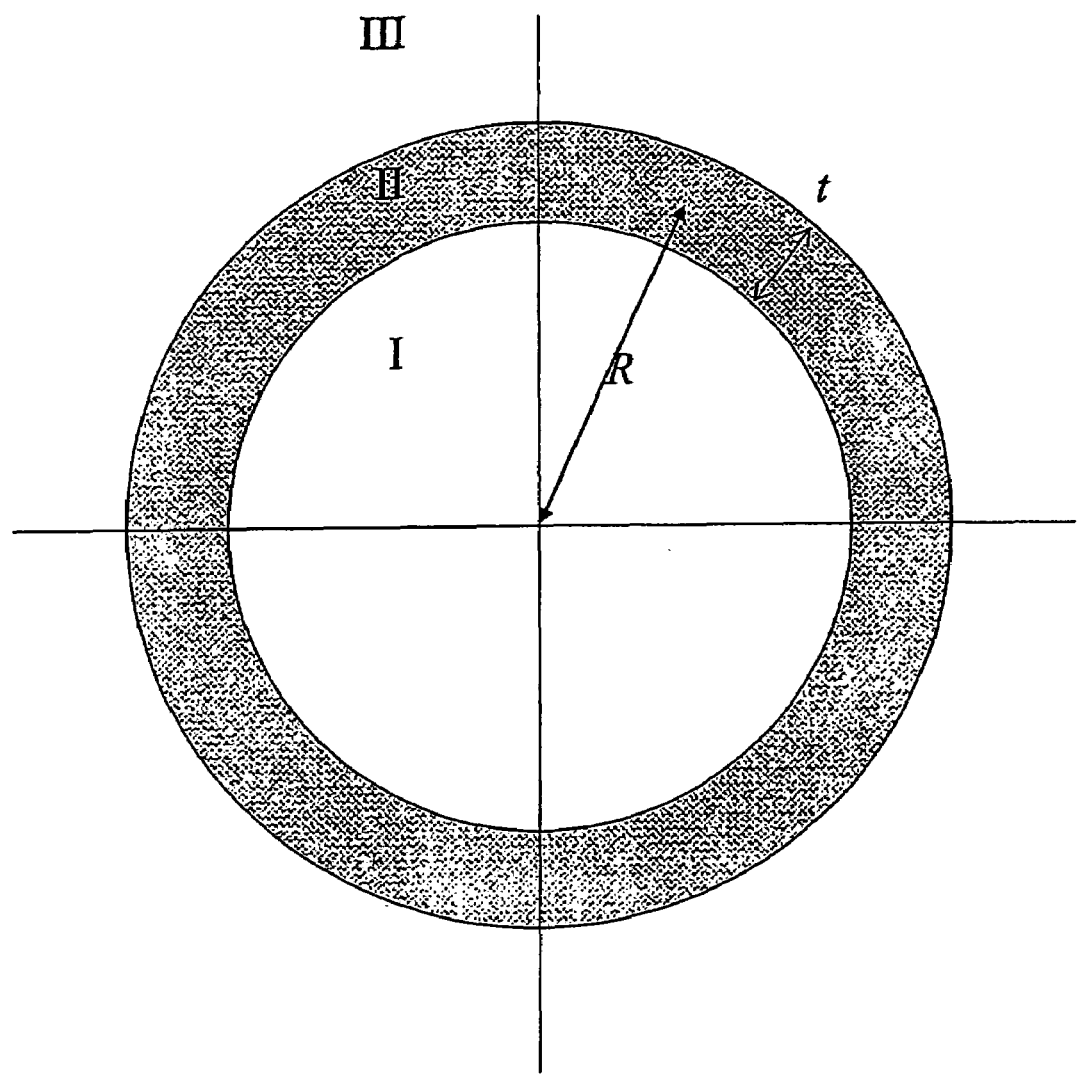
FIG. 3 is a diagram which shows in transverse cross section of a circular tube of silica in air.
Figure 5:
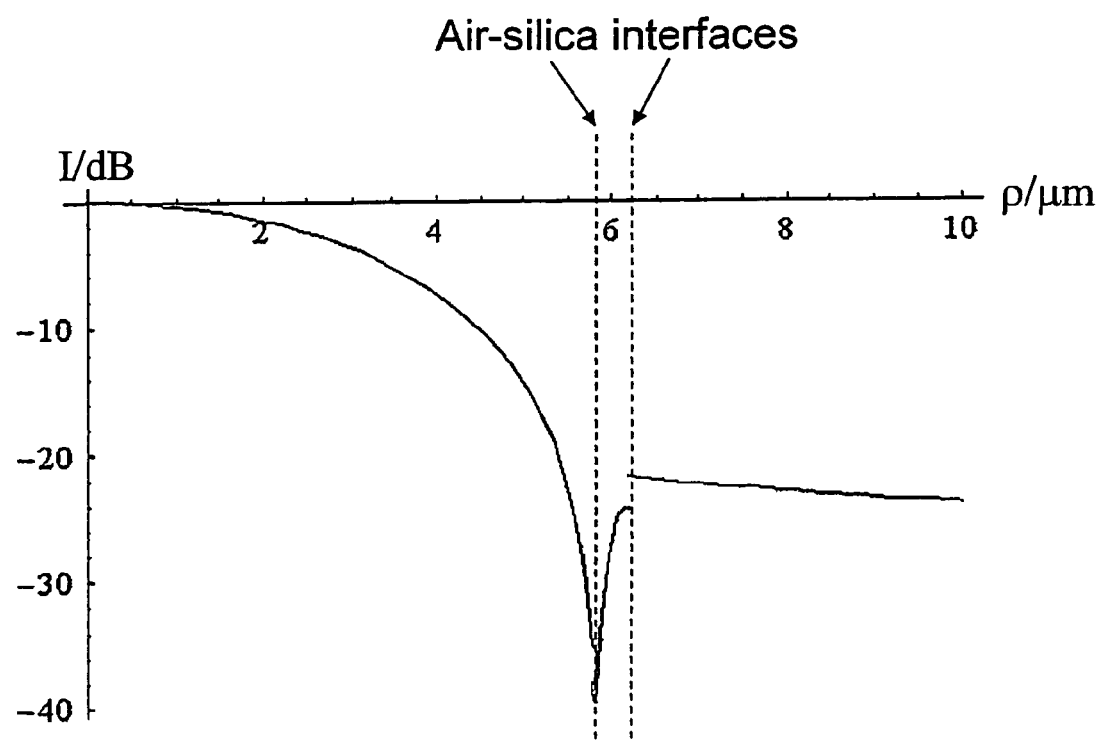
FIG. 5 is a graph which shows the radial dependence of the $LP_{01}$-like leaky mode field intensity for an anti-resonant silica tube of the kind shown in FIG. 2.
Figure 7:
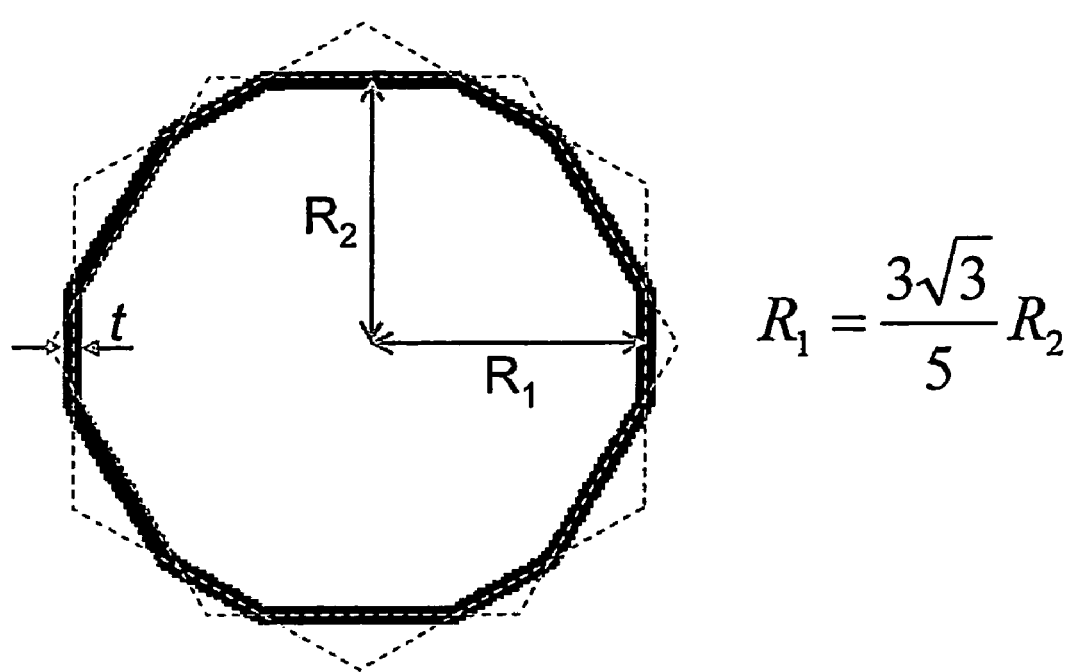
FIG. 7 is a diagram which illustrates the geometry of a dodecagonal core surround.
Figure 8A:
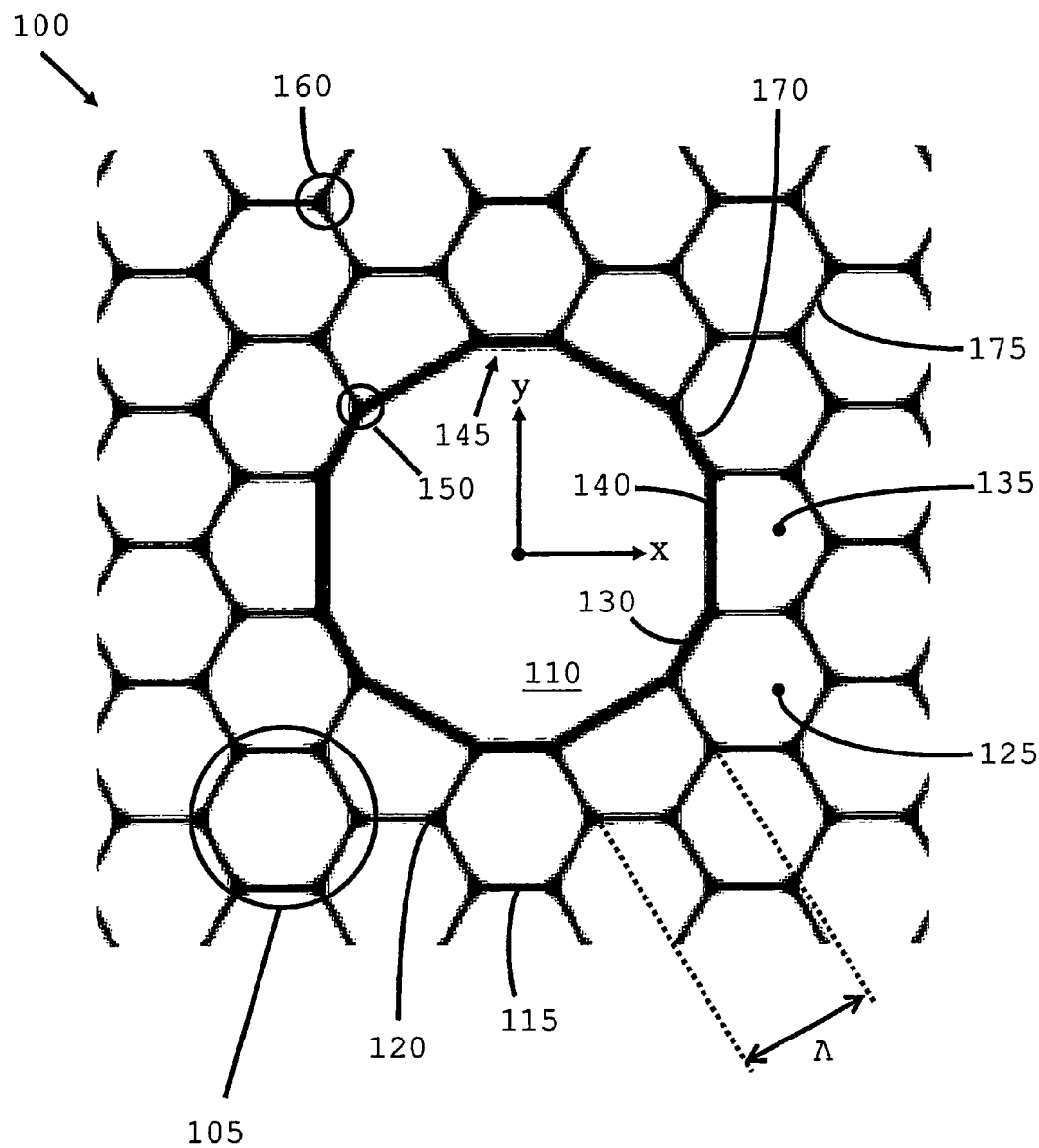
FIGS. 8a and 8b are diagrams of transverse cross sections of PBG fibre structures of the kind used in embodiments of the present invention, wherein the structure illustrated in FIG. 8a has a seven-cell core defect and the structure illustrated in FIG. 8b has a nineteen-cell core defect.

FIG. 8a is a representation, shown in transverse cross-section, of an inner region of a PBG fibre waveguide structure of the kind used in embodiments of the present invention. In the Figure, the black regions represent fused silica glass and the white regions represent air holes in the glass. As illustrated, the cladding 100 comprises a triangular array of generally hexagonal cells 105, surrounding a seven-cell core defect 110. This region of the cladding, although not shown in its entirety, typically extends outwardly to provide a specified degree of light confinement; where more cladding layers provide increased confinement. Typically, although not shown, there are further cladding layers surrounding the photonic band-gap structure. There may be an additional solid silica layer to provide strength and a coating layer to protect the silica and prevent light entering the fibre from the side, as in a normal fibre. A core defect boundary 145 is at the interface between the cladding and the core defect. The core defect boundary has twelve sides—alternating between six relatively longer sides 140 and six relatively shorter sides 130—and is formed by omitting or removing seven central cells—an inner cell and the six cells that surround the inner cell. The cells would have typically been removed or omitted from a pre-form prior to drawing the pre-form into the fibre. As the skilled person will appreciate, although a cell comprises a void, or a hole, for example filled with air or under vacuum, the voids or holes may alternatively be filled with a gas or a liquid or may instead comprise a solid material that has a different refractive index than the material that surrounds the hole. Equally, the silica glass may be doped or replaced by a different glass or other suitable material such as a polymer. For the sake of simplicity of description herein, however, the following exemplary embodiments are silica and air fibres.

The waveguide of FIG. 8a has a substantially periodic structure, comprising a triangular lattice of generally hexagonal holes. However, as already discussed, N. M. Litchinitser et al. have demonstrated that photonic bandgaps may be achieved in non-periodic structures. The properties of the core-cladding boundary are also important in non-periodic PBG structures and the invention is not limited to substantially periodic structures but encompasses structures with some or even a high degree of aperiodicity or irregularity in the cladding structure. However, the exemplary embodiments illustrated hereafter use a triangular lattice of the kind shown in FIG. 8a, which will be familiar to the skilled artisan, in order not to obscure the present invention.

Hereafter, and with reference to FIG. 8a, a region of glass 115 between any two holes is referred to as a "vein" and a region of glass 120 where three veins meet is referred to as a "node". A vein can be generally characterised by its transverse, cross-sectional length and thickness at a midpoint between the two nodes to which it is attached. Veins tend to increase in thickness from their midpoint to the nodes, although a region of substantially constant thickness at the middle of the vein tends to appear and then increase in length with increasing air-filling fraction. Nodes can be generally characterised by a transverse cross-sectional diameter, which is the diameter of the largest inscribed circle that can fit within the node. In the fibre structures investigated herein, node diameter is typically larger than the thickness of the veins attached to the node.

The core defect boundary 145 comprises the inwardly-facing veins of the innermost ring of cells that surround the core defect 110.

In practice, for triangular lattice structures that have a large air-filling fraction, for example above 85%, most of the cladding holes 105 assume a generally hexagonal form, as shown in FIG. 8a, and the veins are generally straight.

The cells forming the innermost ring around the boundary of the core defect, which are referred to herein as "boundary cells", have one of two general shapes. A first kind of boundary cell 125 is generally hexagonal and has an innermost vein 130 that forms a relatively shorter side of the core defect boundary 145. A second kind of boundary cell 135 has a generally pentagonal form and has an innermost vein 140 that forms a relatively longer side of the core defect boundary 145.

There are twelve boundary cells 125, 135 and twelve nodes 150, which are referred to herein as "boundary nodes", around the core defect boundary 145. Specifically, as defined herein, there is a boundary node 150 wherever a vein between two neighbouring boundary cells meets the core defect boundary 145. In FIG. 8a, these boundary nodes 150 have slightly smaller diameters than the cladding nodes 160. For the present purposes, the veins 130 & 140 that make up the core defect boundary are known as "boundary veins".

Figure 8B:
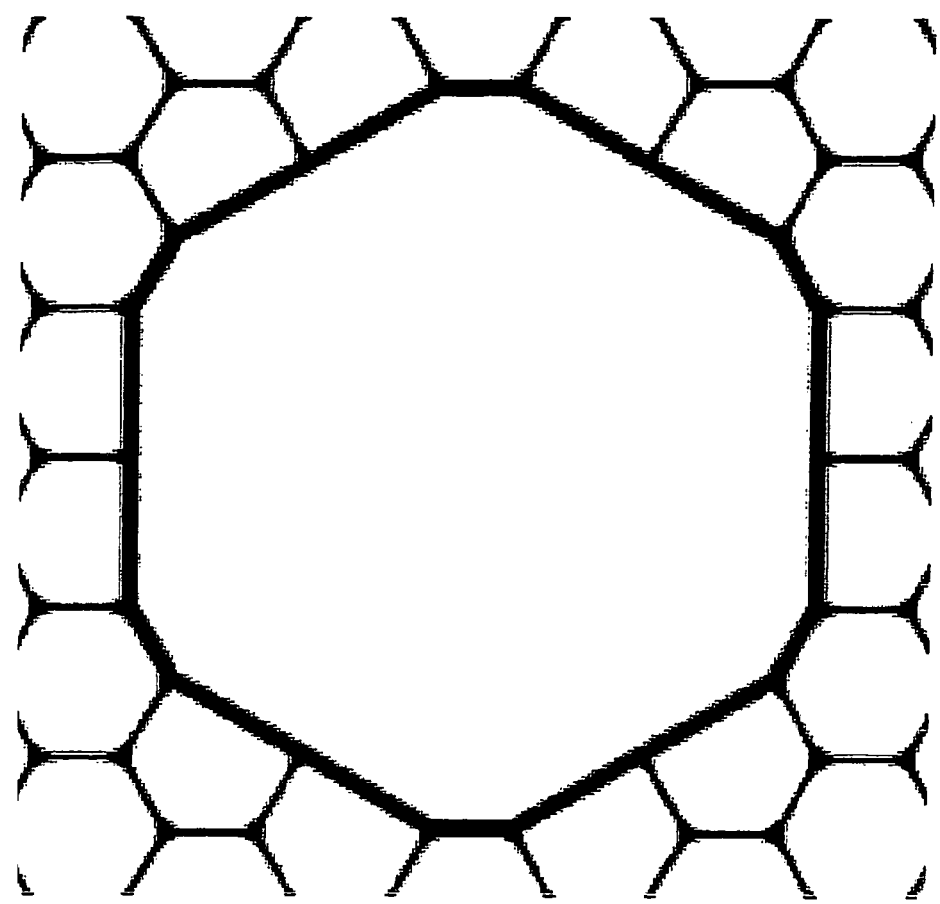

FIG. 8b is a diagram of an exemplary nineteen-cell core defect structure. Other than the size of the core defect, the structure has the same cladding properties as the structure shown in FIG. 8a.

In both structures, the core defect boundary 145 can be thought of as a generally annular, constant thickness region of glass surrounding the core region 110 and acting to provide confinement of light to the core independently of, but in addition to, the photonic band-gap structure that forms the inner cladding region 100. Clearly, the boundary region is not perfectly annular, due to it being formed from plural, generally straight boundary veins, and is not of constant thickness, due to slight variations in thickness along boundary veins and, in particular, at boundary nodes. However, for the present purposes herein, this kind of core boundary will be thought of as being generally annular and of generally constant thickness.

In the prior art, photonic band-gap fibres typically comprise either plural concentric layers of dielectric material surrounding a core, to form an omni-directional waveguide, or a microstructured photonic band-gap cladding, comprising a triangular lattice of hexagonal holes, surrounding a core region. In the latter kind of band-gap fibre, there is a core defect boundary but the shape and form of the boundary has typically been a simple function or artefact of the pre-form and manufacturing process used to make the fibre. Certainly, there are no prior art band-gap fibres of the kind presented in the exemplary embodiments herein, in which a generally annular core boundary region, which is produced to be substantially anti-resonant, sits at the interface between a core region and a periodic, microstructured photonic band-gap cladding structure.

The structures in FIGS. 8a and 8b, and each of the following examples of different structures, closely resemble practical optical fibre structures, which have either been made or may be made according to known processes or the processes described hereinafter. The structures have the following characteristics in common (unless otherwise stated):

a pitch $\Lambda$ of the cladding chosen between values of approximately 3 μm and 6 μm (this value may be chosen to position core-guided modes at an appropriate wavelength for a particular application);

a thickness t of the cladding veins (at their mid-points) of 0.0548 times the chosen pitch $\Lambda$ of the cladding structure (or simply 0.0548$\Lambda$);

an air-filling fraction in the cladding of approximately 87.5%.

Of course, smaller pitches may be chosen for fibres operating in short wavelength regimes, for example at 800 nm or in the visible regions of the electromagnetic spectrum, and larger pitches may be chosen for operation in the mid-IR spectrum or even at the $CO_2$ laser wavelength of 10.6 μm. For longer wavelength applications, for example beyond 2 μm, the larger pitch may be used in tandem with a material other than silica, which should be optically transparent at the respective wavelength.

As described above, the present inventors have determined that it is possible to control the performance of PBG fibres in particular by minimising the F-factor or maximising the amount of light that propagates in air within the fibre structure, even if some light is not in the core, in order to benefit from the properties of PBG fibres, such as reduced absorption, non-linearity and, in addition, reduced mode coupling. As has been described, light in air and F-factor are proxies to anti-resonance exhibited by the core boundary.

To this end, the inventors have analysed a significant number of, both, seven-cell and nineteen-cell core defect PBG fibres in which only the thickness of the boundary veins has been varied; from 1.4 times the thickness of the cladding veins to 2.4 times the thickness of the cladding veins, in steps of 0.1 times the thickness of the cladding veins for the seven cell defect fibres and from 0.7 times the thickness of the cladding veins to 2.5 times the thickness of the cladding veins, in steps of 0.1 times the thickness of the cladding veins the nineteen-cell core defect fibres.

All boundary vein thicknesses are measured at their centre points between the two boundary nodes to which they are attached. It is evident that even relatively thick boundary veins are slightly thicker at the point where they meet the boundary nodes than at their mid-points between nodes. However, for the purpose of stating boundary vein thickness, the thickness of the vein at its centre is used and the slightly increased thickness of the boundary veins at their ends is ignored.

The ranges of boundary thickness values sampled include the theoretical anti-resonant point, which is somewhere between 2.1 and 2.3 times the thickness of the cladding veins (equivalent to 0.371-0.407 μm at an operational wavelength of 1550 nm); the anti-resonant point being at an approximate thickness of 0.4 μm according to the graphs in FIG. 4. Specific details of the seven-cell core defect structures are provided in Table 1 below.

TABLE 1

| Boundary vein thickness relative to: | | | | | |
|---|---|---|---|---|---|
| Cladding vein thickness (%) | Cladding pitch $\Lambda$ | Operating wavelength $\lambda$ (%) | Absolute thickness (μm) | Light power in air $\eta$ (%) | F-factor ($\Lambda^{-1}$) |
| 140 | 0.077 | 16.0 | 0.248 | 92 | 1.68 |
| 150 | 0.082 | 17.1 | 0.266 | 97 | 0.67 |
| 160 | 0.088 | 18.3 | 0.283 | 98 | 0.38 |
| 170 | 0.093 | 19.4 | 0.301 | 98 | 0.34 |
| 180 | 0.099 | 20.5 | 0.318 | 99 | 0.23 |
| 190 | 0.104 | 21.7 | 0.336 | 99 | 0.23 |
| 200 | 0.110 | 22.8 | 0.354 | 98 | 0.29 |
| 210 | 0.115 | 24.0 | 0.371 | 97 | 0.46 |
| 220 | 0.121 | 25.1 | 0.389 | 90 | 1.17 |
| 230 | 0.126 | 26.3 | 0.407 | 89 | 1.06 |
| 240 | 0.132 | 27.4 | 0.425 | 95 | 0.57 |

In Table 1, boundary vein thickness is presented in four alternate ways. The first column shows boundary vein thickness relative to cladding vein thickness. The second column shows boundary vein thickness relative to the selected pitch $\Lambda$ of the cladding structure. The third column shows boundary vein thickness as a function of the selected operating wavelength $\lambda$. These three measures are scalable and remain the same for a broad range of PBG fibre structure pitches and operating wavelengths for structures within the same bandgap. The fourth column shows absolute boundary vein thickness in μm for an operating wavelength of 1.55 μm and may be scaled according to Equations (1) and (2).

The fifth and sixth columns show values for percentage of light power in air η and F-factor respectively for the eleven structures. F-factor is shown in terms of $\Lambda^{-1}$ and is thus relevant to PBG fibres with periodic cladding structures. It is easy to calculate absolute F-factor in terms of $\mu m^{-1}$ for an absolute wavelength of 1.55 μm by dividing the F-values by 3 (since pitch is selected to be about 3 μm for a 1.55 μm operating wavelength).

The light-in-air and F-factor of a particular structure is directly measurable. The method of measuring light-in-air involves taking a near-field image of light as it leaves the structure, overlaying it on a scanning electron micrograph (SEM) or atomic force microscopy (AFM) image of the structure and directly calculating the % light-in-air from the overlap of the two images, although care needs to be taken since the field can vary rapidly across the boundary between air and glass. Such techniques will be readily apparent to those skilled in the art of optical fibre measurement techniques.

The light-in-air and F-factor can also be calculated more indirectly for a real fibre structure by the following method. A SEM or AFM image is taken of the cross-sectional structure of the fibre in question. An accurate representation of the structure, suitable for use in computer modelling, is obtained from the SEM by estimating the position of the structural boundaries throughout the cross-section. Based on this representation, the mode field can be simulated by solving Maxwell's vector wave equation for the fibre structure, using known techniques. In brief, Maxwell's equations are recast in wave equation form and solved in a plane wave basis set using a variational scheme. An outline of the method may be found in Chapter 2 of the book "Photonic Crystals—Molding the Flow of Light", J. D. Joannopoulos et al., ©1995 Princeton University Press. This knowledge of the electric and magnetic field distributions enables both the numerator and denominator in Equation (9) above to be calculated. The fraction η of light in air may also be calculated by superimposing the modelled mode on the modelled structure.

The very small size of the thin veins in the structure means that great care must be taken when interpreting an SEM image. The apparent thickness of a vein in the image may be slightly different from the true thickness, but the small discrepancy will have a large impact on the light-in-air and F-factors determined from it. It is therefore advisable to confirm the validity of the process by which the model structure is determined from the SEM image, to yield a reliable fit. One way to confirm the fit would be through spectral measurements of the loss of the fibre, which often show peaks at particular wavelengths due to mode crossings [see, for example, Smith et al., "Low-loss hollow-core silica/air photonic bandgap fibre", Nature, Vol. 424 pp 657-659, 7 Aug. 2003].

Figure 9A:
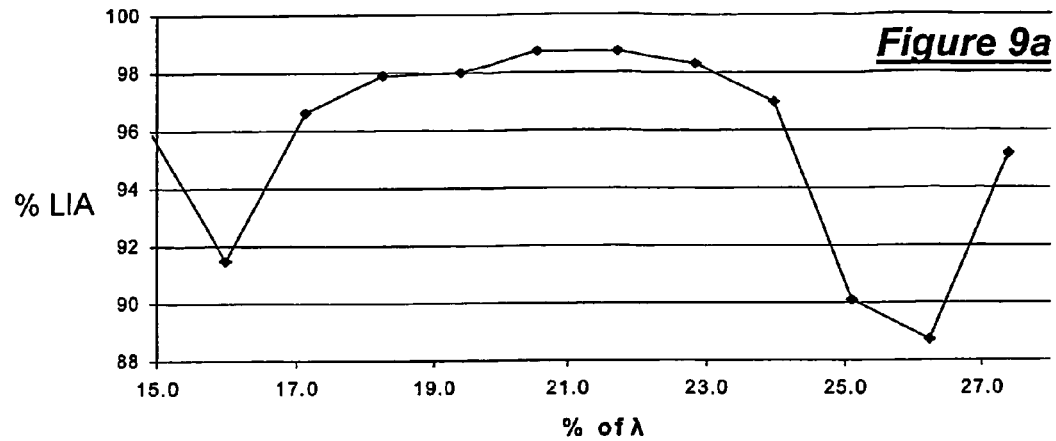
FIGS. 9a and 9b are graphs which show light power in air and F-factor respectively for seven-cell PBG fibre structures having different boundary thicknesses and FIG. 9c is a graph of F-factor for nineteen-cell PBG fibre structures having different boundary thicknesses.
Figure 9B:
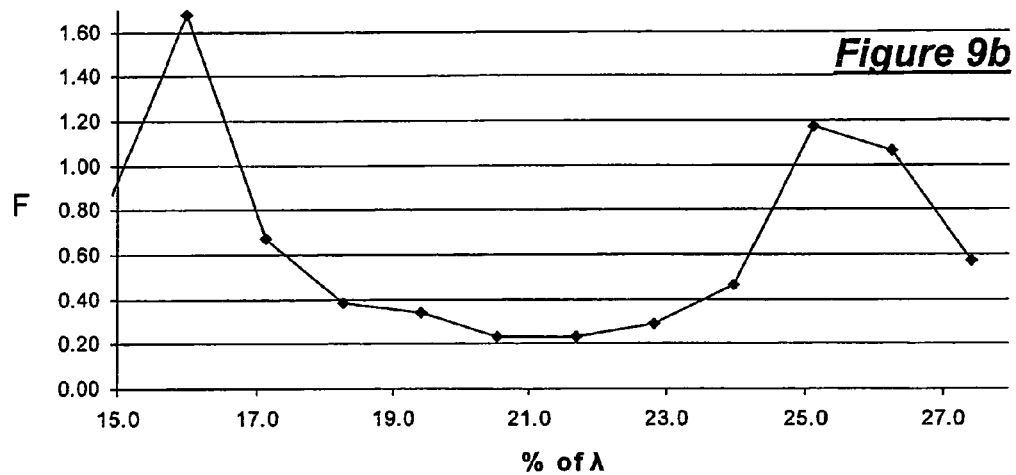

The values for light power in air η and F-factor for a seven cell core defect fibre are plotted in the graphs in FIGS. 9a and 9b respectively for a fixed operating wavelength of 1550 nm. The horizontal axes of these plots are labelled as a core boundary thickness in terms of a percentage of the selected operating wavelength. In generating the plots of FIGS. 9a and 9b, the fibre structure of FIG. 8a was modelled on a computer and the proportion of light in air η and the F-factor were calculated for various boundary vein thicknesses t. Each point in the plots represents one thickness, according to the values in Table 1.

Figure 9C:
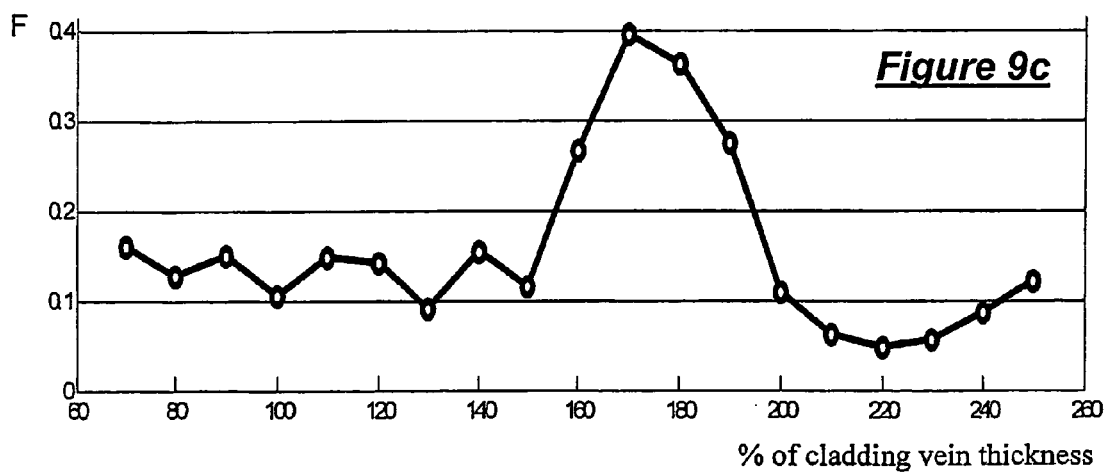

Similarly, the values of F-factor for nineteen-cell core defect structures having varying core boundary thicknesses are plotted in the graph in FIG. 9c. This time, the horizontal axis of the plot is labelled as a core thickness in terms of a percentage of the cladding vein thickness. A graph of light in air for these structures is not shown, since it is evident that it would substantially mirror the F-factor graph. However, the highest identified light in air value, which is coincident with the lowest F-factor value, is in the region of 99.7%. This value increases to about 99.95% for a similar 37-cell core defect structure, which has a lowest F-factor of about $0.01\Lambda^{-1}$. The benefit of F-factor decreasing, and light in air fraction increasing, with increasing core defect diameter is at least to some degree tempered by a larger core potentially supporting more core-guided modes and surface states, which can lead to an undesirable increase in mode coupling.

The plots demonstrate that η and F-factor vary considerably with core boundary vein thickness even over the relatively small range of thickness values modelled. In particular, the maximum value for η and the minimum value of F-factor, for the seven cell core defect structures, appear for boundary vein thicknesses in the range 0.3-0.37 μm. This range is slightly below the calculated anti-resonant boundary thickness of 0.392 μm for the 6 μm tube.

Referring to the graph in FIG. 9c, the optimum value of core boundary thickness for a nineteen cell core defect is in the range 0.354-0.425 μm, which encompasses the modelled anti-resonant point for a 9 μm tube.

The foregoing technique of measuring F-factor and light in air fraction has been shown to provide a reliable means for distinguishing between good and bad structures and ascertaining antiresonant core wall thicknesses. Obviously, a more rigorous numerical analysis might involve plotting η and F-factor for all values of wavelength within the bandgap, since the plots can vary slightly at different wavelengths, particularly in the vicinity of mode crossings, as described hereinafter.

The simple circular core surround model for the properties of the fundamental guiding mode of band gap fibres is found to be more accurate for nineteen-cell core defects than for seven-cell core defects at the selected operating wavelength of 1550 nm, and becomes increasingly accurate when the core boundary thickness approaches an optimum anti-resonance value. This is because the field intensity of the normalized fundamental guided mode outside the core boundary and air core region becomes smaller as the core size is increased and anti-resonance is approached. The field of the fundamental mode is then less perturbed by the cladding: the effect of the cladding is simply to render the small field component which remains exterior to the core surround evanescently decaying. As has already been mentioned, the slight non-circularity of the core surround in practical fibres is found not to change significantly the properties of the fundamental guiding mode from that of a perfectly circular geometry.

Following on from this, it will be apparent that different cladding structures, in which different numbers or shapes of boundary vein (or, indeed, other forms of relatively high refractive index material) meet the core boundary, will cause the effective boundary thickness to vary for a given absolute boundary vein thickness. While it might be relatively complex to model exact anti-resonance for such boundaries, which may differ significantly from a tube or even a dodecagon, by following the teachings provided herein, the skilled person will be able to calculate η or F-factor and use either one as a proxy to design an anti-resonant boundary.

In considering in more detail the shape of the curve in FIGS. 9a (light in air percentage) and 9b (F-factor), it is apparent that local minima of the former and maxima of the latter occur at core vein thicknesses around 16% and 25% of the operating wavelength λ. The present inventors do not believe, however, that these spikes coincide with resonances of the core boundary. By substituting an operating wavelength of 1550 nm into Equation (2), the first-order resonance peak should occur at an absolute boundary thickness of around 0.74 µm, which equates to a value of around 48.4% of the operating wavelength. Clearly, this value is significantly higher than either value associated with the spikes in FIGS. 9a and 9b. The present inventors suggest that the spikes are due to interactions between the mode being investigated and so-called surface modes near to the core boundary. This kind of interaction is also identified in Müller, D. et al. "Measurement of photonic band-gap fiber transmission from 1.0 to 3.0 µm and impact of surface mode coupling." QTuL2 *Proc. CLEO* 2003 (2003). This paper supports the present inventors' view that mode power from the air-guided modes may couple to lossy surface modes, which concentrate in or near to the core boundary. The result is increased loss, attendant increased F-factor and reduced light in air fraction. As already mentioned, the effect of mode crossings can also vary with wavelength. Indeed, it is found using the previously described circular core surround model that such mode crossings are suppressed for core thicknesses close to the anti-resonant value, but become abundant for core thicknesses away from anti-resonance. This surface mode exclusion property associated with the anti-resonance renders the curves (for example as shown in FIG. 9) for F-factor and percentage of light in air smoother as they reach optimum values at core boundary thicknesses close to the anti-resonant point.

That an antiresonant core boundary is desirable for reducing the impact and/or number of surface modes in a PBG fibre is surprising and counter-intuitive, particularly when one considers the prior art, for example the teachings in the book "Photonic Crystals: Molding the Flow of Light". From such a reference, the skilled man would understand that surface modes can form due to the inclusion of a defect in a PBF structure; for example a hollow core defect in a PBG fibre. After appreciating this, it would appear sensible to include only a single defect in the structure; where plural defects could lead to plural sets of surface modes. Hence, it would appear reasonable to form a core defect boundary that, as closely as possible, matches the veins in the cladding structure. Otherwise, the core defect boundary might been 'seen' by the light as an additional defect, or even a waveguide in its own right, since it neither matches the core defect nor the cladding. In other words, having a core defect boundary that is significantly different, for example thicker in transverse cross section, than the individual cladding veins of the PBG cladding structure, would not have been a natural choice for the skilled person who wanted to avoid the formation of surface modes.

In order to remove the peaks in FIGS. 9a to 9c, it is either necessary to remove the surface states or adjust the operating point of the respective waveguide to avoid mode crossings. Moving the operating point for a given geometry can be achieved by varying the operating wavelength within the band gap and/or adjusting the pitch Λ of the photonic band-gap structure. Clearly the avoidance of mode crossings facilitated by a core surround close to anti-resonance will typically enable a wider wavelength bandwidth to be of practical use.

Figure 10A:
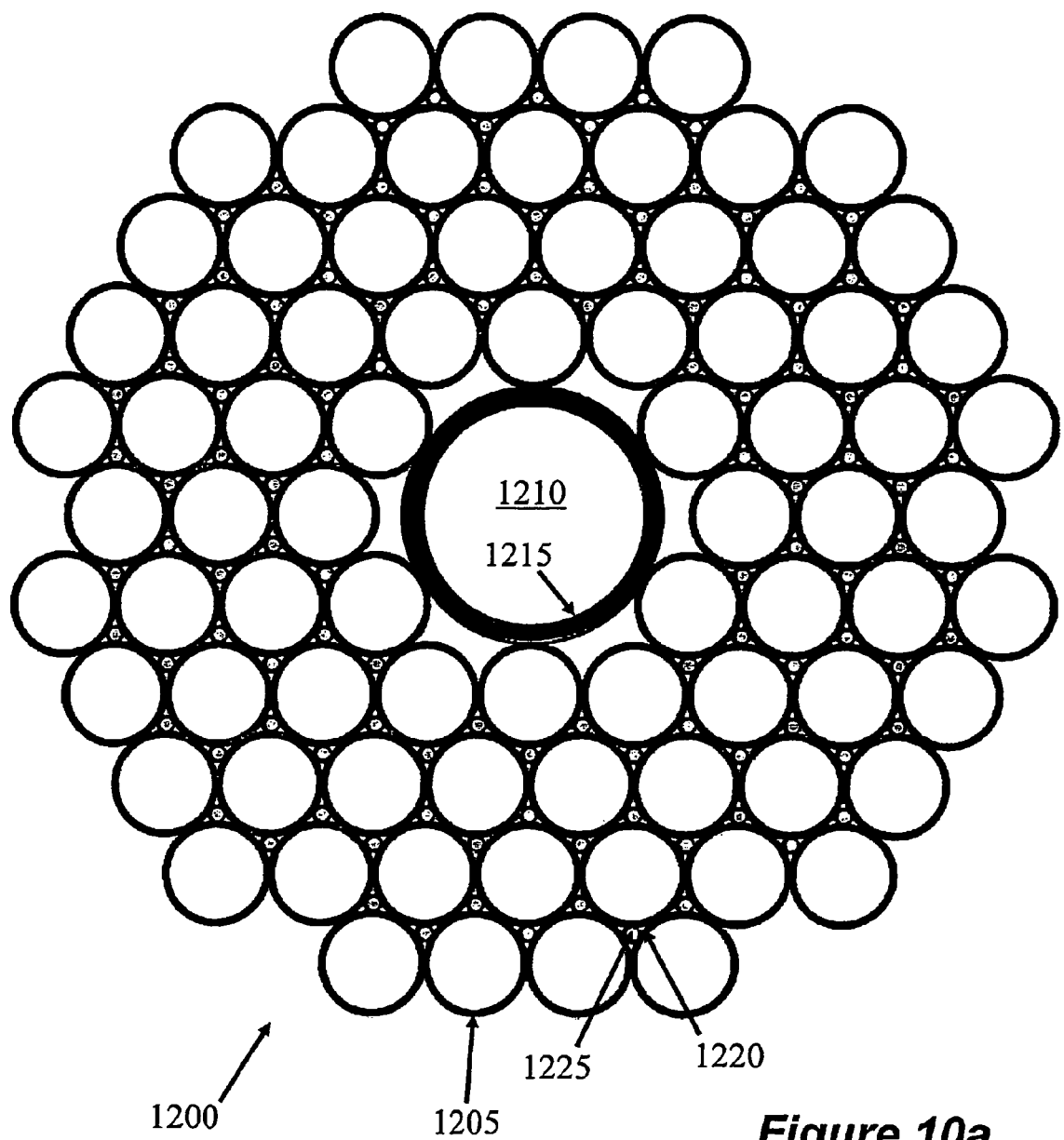
FIGS. 10a and 10b are diagrams illustrating arrangements of capillaries and rods used in forming waveguide structures according to embodiments of the present invention.
Figure 11A:
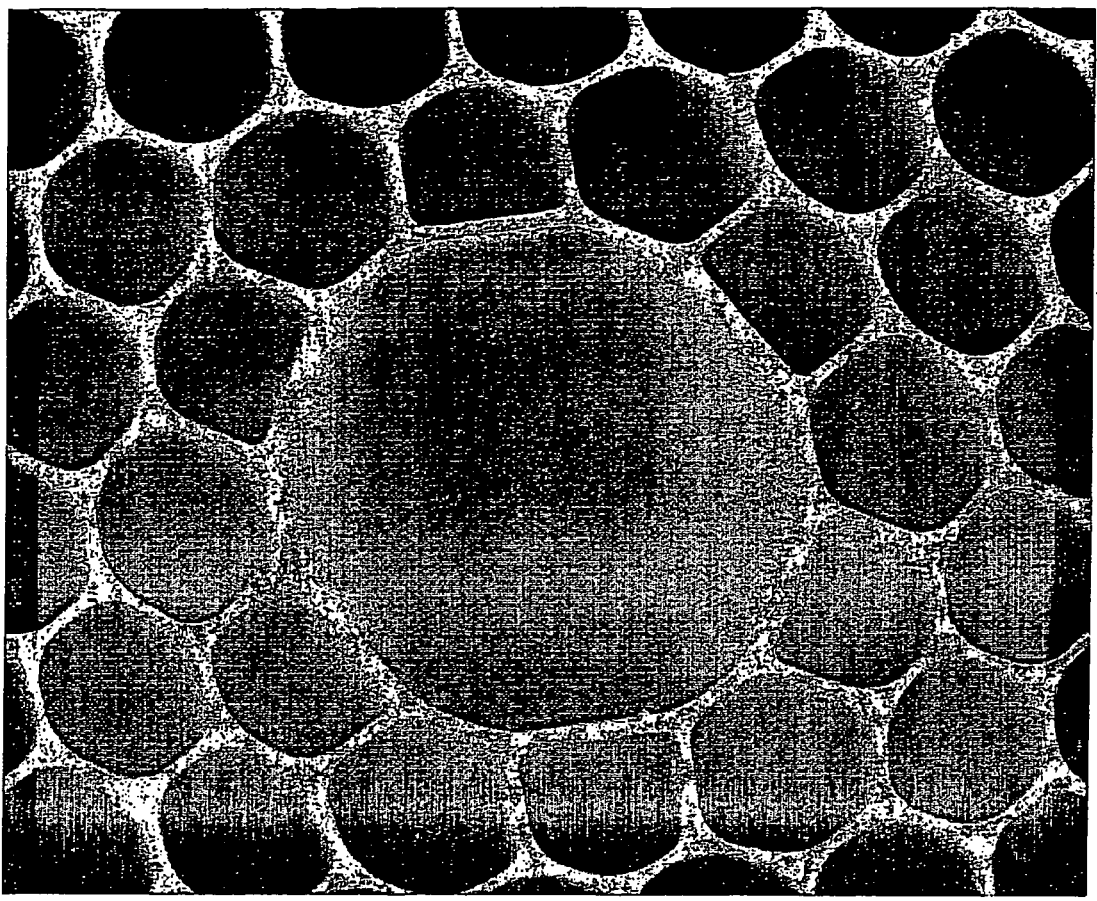
FIGS. 11a and 11b are scanning electron micrographs of a seven-cell core defect structure and a nineteen-cell core defect structure made from pre-forms according to FIGS. 10a and 10b respectively.

FIG. 10a illustrates one way of arranging a stack of capillaries 1200 to be drawn into a pre-form and fibre of the kind that is exemplified by FIG. 8. The cladding is formed by stacking round cross-section capillaries 1205 in a close-packed, triangular lattice arrangement. The cladding capillaries 1205 have an outer diameter of 1.04 mm and a wall thickness of 40 µm. The inner region 1210 of the stack contains a large diameter capillary 1215 having an outer diameter of 4.46 mm and a wall thickness of 105 µm. The large diameter capillary 1215 supports the cladding capillaries while the stack is being formed and eventually becomes part of the material that forms a core defect boundary 145. The resulting structure, as shown in the SEM image of FIG. 11a, has a boundary wall thickness in the region of 7% of the pitch, which is slightly below the optimum region for anti-resonance.

Interstitial voids 1220 that form between each triangular group of three cladding capillaries are each packed with a glass rod 1225, which has an outer diameter of 0.498 mm. The rods 1225 are inserted into the voids 1220 after the capillaries have been stacked. The rods 1225 that are packed in voids 1220 assist in forming cladding nodes 160, which have a diameter that is significantly greater than the thickness of the veins that meet at the nodes. Omission of a rod from a void in the cladding would lead to the formation of a cladding node that has a significantly smaller diameter.

The stack 1200 is arranged as described with reference to FIG. 10a and is then over-clad with a further, relatively thick walled capillary (not shown), which is large enough to contain the stack and, at the same time, small enough to hold the capillaries and rods in place. The entire over-clad stack is then heated and drawn into a pre-form, during which time all the interstitial voids at the boundary, and remaining voids between the glass rods and the cladding capillaries, collapse due to surface tension. The pre-form is, again, over-clad with a final, thick silica cladding and is heated and drawn into optical fibre in a known way. If surface tension alone is insufficient to collapse the interstitial voids, a vacuum may be applied to the interstitial voids of the pre-form, for example according to the process described in WO 00/49436 (The University of Bath).

The thickness of the boundary resulting from the stack in FIG. 10a is readily varied by using different thicknesses of large diameter capillary 1215.

Figure 10B:
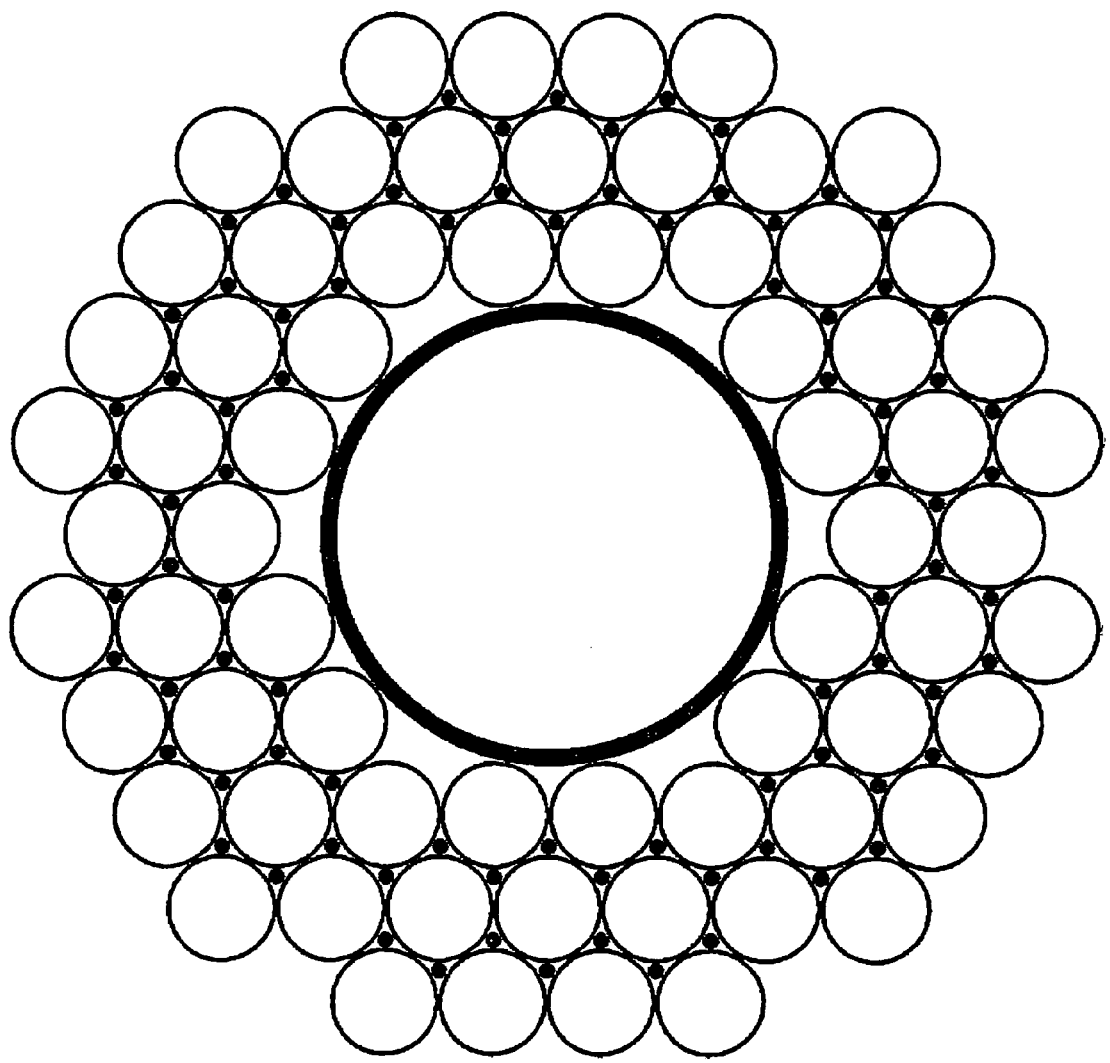

FIG. 10b is a diagram of a stack, similar to the stack shown in FIG. 10a, but this time suitable for making a nineteen-cell core defect fibre. As shown, an inner region of the stack is supported around a thick walled, relatively large capillary, in place of nineteen cladding capillaries; an inner capillary, the six capillaries that surround the inner capillary and the twelve capillaries that surround the six capillaries. The cladding capillaries have an outside diameter of about 1.8 mm and a wall thickness of about 50 µm and the core tube has an outside diameter of about 7.6 mm and a wall thickness of about 300 µm.

Figure 11B:
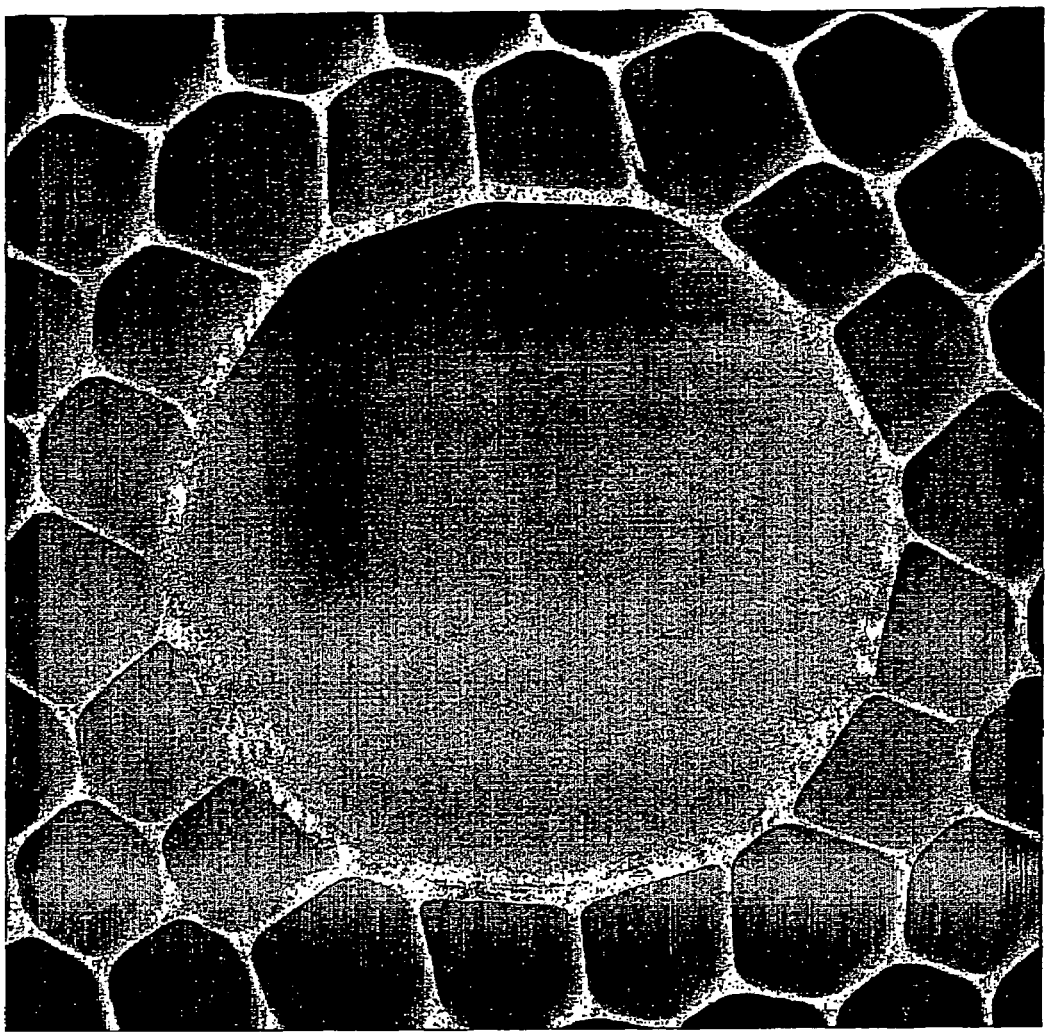

The stack shown in FIG. 10b can be drawn down (which may involve applying appropriate pressures to the various holes in the pre-form) to produce a fibre as shown in the SEM image in FIG. 11b. The cladding of the fibre has a pitch Λ in the region of about 3.75-3.83 µm, a core diameter of about 17.7 µm and an average core thickness of about 0.09-0.1Λ, an AFF of about 0.92 (92%) and a value of d/Λ of about 0.97 (where d in this case is the shortest distance between opposing sides of a hexagonal cladding hole).

According to the plots in FIGS. 4a, 4b and 9c, the anti-resonance point for a nineteen-cell core defect fibre is in the region of 0.4 µm (or 0.12Λ). The core boundary thickness for the fibre structure shown in FIG. 11b, therefore, is slightly below the anti-resonant point. In order to make a thicker core boundary, therefore, it would be necessary to use similar fibre drawing conditions and a slightly thicker, large diameter, inner tube in the stack.

Figure 12:
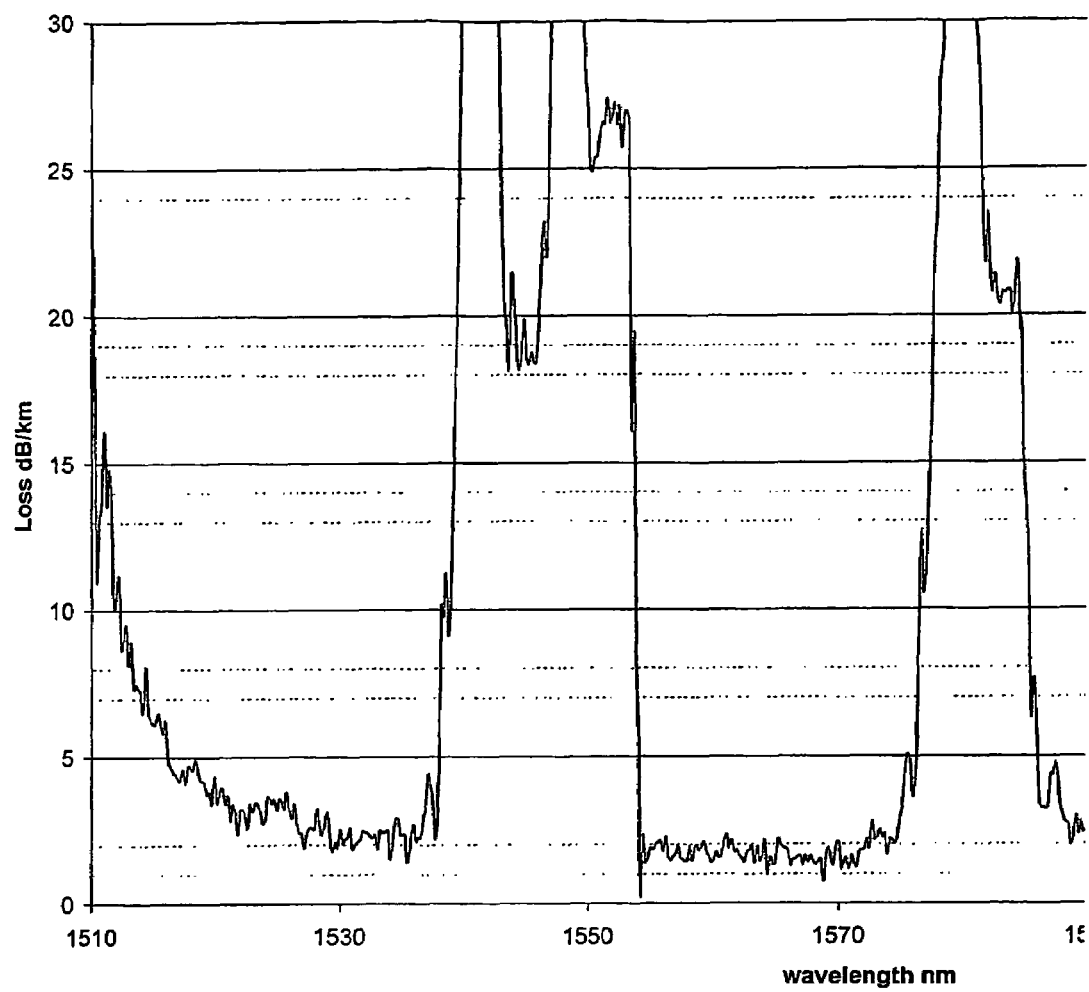
FIG. 12 is a graph showing transmission loss plotted against wavelength for the fibre shown in transverse cross section in FIG. 11b.

The graph in FIG. 12 is a plot of loss (in dB/km) against wavelength for the fibre shown in the image of FIG. 11b. The plot was generated using an optical spectrum analyser to measure transmitted power through a length of more than 1 km of fibre, and various cut-back lengths. As can be seen, the loss is in the region of 2 dB/km over a significant band of wavelengths about a centre frequency of about 1566 nm. Such a low loss has, hitherto, not been reported for hollow core photonic band-gap fibres. The lowest previously-reported loss is 13 dB/km. The present fibre exhibits such a low loss while not even having an optimum core boundary thickness. The present inventors are confident that a similar fibre having a slightly thicker core boundary, which is nearer to the anti-resonance point and has an attendant lower F-factor, will achieve an even lower loss, for example even lower than 1 dB/km. In addition, with reference to the SEM image in FIG. 11b, there is clearly scope to improve the uniformity of the photonic band-gap structure in the fibre. Improved uniformity, both in the transverse and longitudinal planes, is reported in the prior art as a means to significantly reduce loss in band-gap fibres. The present inventors agree and believe that increased uniformity will lead to significant reductions in loss, for example to below 0.5 dB/km or even below 0.2 dB/km, which is the approximate loss of standard, single mode optical fibre.

In addition, as described in the aforementioned paper "Low loss (1.7 dB/km) hollow core photonic bandgap fiber", the present inventors predict that the loss of a fibre structure of the kind shown in FIG. 11b may be reduced to below 1 dB/km simply by scaling the dimensions of the structure for operation in the wavelength region of between 1800 nm and 2000 nm.

Figure 13:
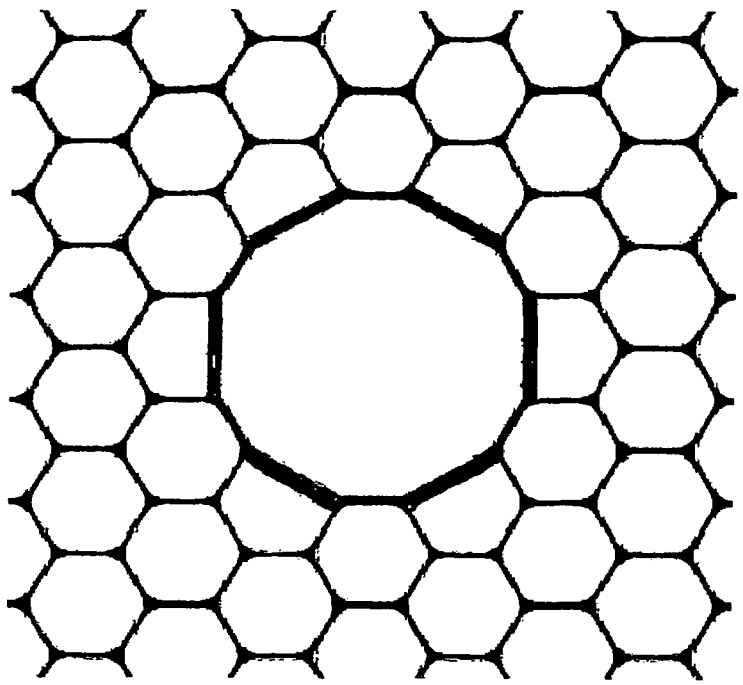
FIG. 13 is a diagram of an alternative embodiment of the present invention.

FIG. 13 is a diagram of an alternative embodiment of the present invention in which a dodecagonal core boundary varies in thickness about the core, with the longer boundary veins being thicker than the shorter ones. The effective thickness of the boundary is a function of the two thickness of boundary vein and their respective lengths as well as the silica that joins to the outer surface of the boundary at boundary nodes.

Figure 14:
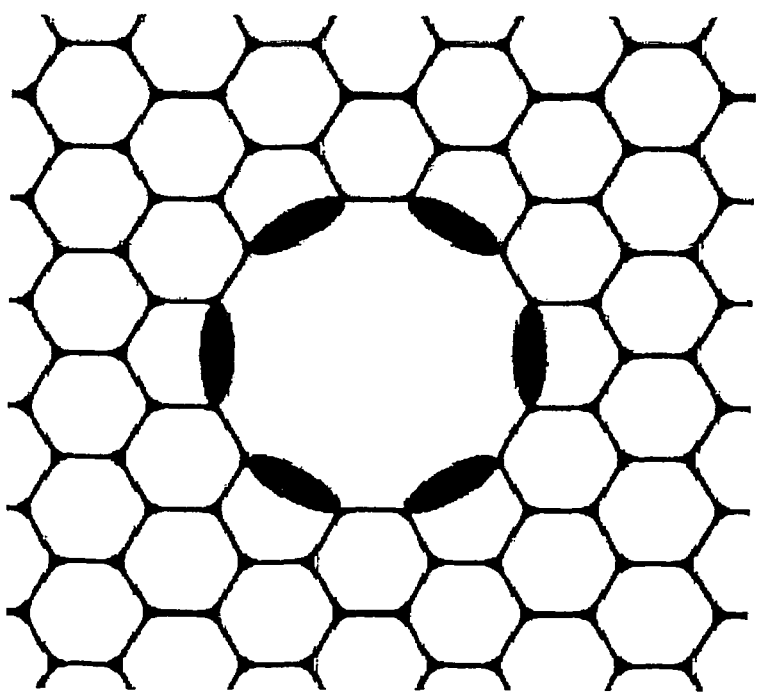
FIG. 14 is a diagram of another alternative embodiment of the present invention.

FIG. 14 is a diagram of a further alternative embodiment of the present invention in which a dodecagonal core boundary has alternating short, thin core boundary veins and long, generally elliptical boundary veins, where the minor axis (or thickness) of the ellipses is significantly longer than the thickness of the shorter sides. Hence, the effective thickness of the boundary is a function of the two kinds of boundary vein as well as the silica that joins to the outer surface of the boundary at boundary nodes.

The PBG fibre structures shown in FIGS. 13 and 14 may be manufactured using known stack and draw methods, wherein preforms are prepared with additional silica rods in regions requiring greater volumes of silica in the final fibre.

The skilled person will appreciate that the various structures described above may be manufactured using the described manufacturing process or a prior art processes. For example, rather than using a stacking and drawing approach to manufacture, a pre-form may be made using a known extrusion process and then that pre-form may be drawn into an optical fibre in the normal way.

In addition, the skilled person will appreciate that while the examples provided above relate exclusively to PBG fibre cladding structures comprising triangular arrays, the present invention is in no way limited to such cladding structures. For example, the invention could relate equally to square lattice structures; or structures that are not close-packed. In general, the inventors propose that given a cladding structure that provides a PBG and a core defect in the cladding structure that supports guided modes, the form of the boundary at the interface between the core defect and the cladding structure will have a significant impact on the characteristics of the waveguide, as described herein.

The skilled person will appreciate that the structures described herein fit on a continuum comprising a huge number of different structures, for example having different combinations of core defect size, boundary vein thickness and, in general, boundary and cladding form. Clearly, it would be impractical to illustrate each and every variant of PBG waveguide structure herein. In particular, where numerical values or ranges of values are given herein for a particular parameter, all combinations with values or ranges of values of other parameters given herein are disclosed unless such combinations are not physically possible. As such, the skilled person will accept that the present invention is limited in scope only by the present claims.

The invention claimed is:

1. An optical waveguide, comprising:
 a core, comprising an elongate region of relatively low refractive index;
 a photonic bandgap structure arranged to provide a photonic bandgap over a range of wavelengths of light, the structure, in a transverse cross section of the waveguide, surrounding the core and comprising elongate relatively low refractive index regions interspersed with elongate relatively high refractive index regions; and
 a relatively high refractive index boundary at the interface between the core and the photonic bandgap structure, the boundary having a thickness around the core such that, in use, light guided by the waveguide is guided in a transverse mode providing an F-factor of less than 0.23 $\mu m^{-1}$ for an operating wavelength of 1.55 $\mu m$, less than an equivalent F-factor value scaled for a different operating wavelength or less than $0.7\Lambda^{-1}$ for structures having a periodic cladding and a pitch $\Lambda$.

2. A waveguide according to claim 1, in which the boundary is anti-resonant at an operating wavelength of light.

3. A waveguide as claimed in claim 1, in which the boundary has a substantially constant thickness around the core.

4. A waveguide as claimed in claim 1, in which the boundary has a thickness that varies around the core, wherein the core boundary has a thickness t around at least a fraction y of the boundary, where y>0.5.

5. A waveguide as claimed in claim 1, in which the boundary comprises, in the transverse cross-section, a plurality of relatively high refractive index boundary veins connected end-to-end around the boundary between neighbouring boundary nodes, each boundary vein being connected between a leading boundary node and a following boundary node, with no nodes in between, and each boundary node being connected between two boundary veins and to a relatively high refractive index region of the photonic bandgap structure.

6. A waveguide according to claim 5, wherein each boundary vein has a characteristic thickness substantially at the mid-point between the two boundary nodes to which it is connected.

7. A waveguide according to claim 5, wherein the characteristic thickness of at least one boundary vein is at least 110% of the characteristic thickness of a plurality of the veins in the array of veins in the photonic band-gap structure.

8. A waveguide as claimed in claim 1, in which the array has a characteristic primitive unit cell and a pitch $\Lambda$.

9. A waveguide as claimed in claim 8, in which the boundary has a thickness t, wherein, t=u$\Lambda$ for a fraction y of the boundary, where u>0.06 and y>0.5.

10. A waveguide as claimed in claims 1, in which the core boundary has a thickness t defined by $$\frac{a\lambda}{4\sqrt{n_{HI}^2 - n_{LO}^2}} \leq t \leq \frac{b\lambda}{4\sqrt{n_{HI}^2 - n_{LO}^2}},$$

where a=0.5 and b=1.75 and $n_{HI}$ and $n_{LOW}$ are the refractive indices of the boundary and of the relatively low refractive index region of the core, respectively.

11. A waveguide according to claim 1, in which the boundary is anti-resonant at an operating wavelength of light.

12. A waveguide as claimed in claim 1, in which the boundary has a substantially constant thickness around the core.

13. A waveguide as claimed in claim 1, in which the boundary has a thickness that varies around the core, wherein the core boundary has a thickness t around at least a fraction y of the boundary, where y>0.5.

14. A waveguide as claimed in claim 1, in which the array has a characteristic primitive unit cell and a pitch $\Lambda$.

15. A waveguide as claimed in claim 1, in which the core boundary has a thickness t defined by $$\frac{a\lambda}{4\sqrt{n_{HI}^2 - n_{LO}^2}} \leq t \leq \frac{b\lambda}{4\sqrt{n_{HI}^2 - n_{LO}^2}},$$

where a=0.5 and b=1.75 and $n_{HI}$ and $n_{LOW}$ are the refractive indices of the boundary and of the relatively low refractive index region of the core, respectively.

16. A waveguide as claimed in claim 1, in which the boundary has a thickness such that, in use, light guided by the waveguide is guided in a transverse mode in which, in the transverse cross-section, more than 95% of the guided light is in the regions of relatively low refractive index in the waveguide.

17. A waveguide as claimed in claim 1, in which the boundary has a thickness such that, in use, light guided by the waveguide is guided in a transverse mode in which, in the transverse cross-section, more than 1% of the guided light is in the regions of relatively low refractive index in the photonic bandgap structure.

18. A waveguide as claimed in claim 1, in which the boundary has a thickness such that, in use, light guided by the waveguide is guided in a transverse mode in which, in the transverse cross-section, more than 50% of the guided light is in the region of relatively low refractive index in the core.

* * * * *